United States Patent
Medema et al.

(10) Patent No.: US 12,544,148 B2
(45) Date of Patent: Feb. 10, 2026

(54) ABLATION PROBES WITH GUIDANCE INDICATORS TO SUPPORT LOCATION AND DIRECTION GUIDANCE SYSTEMS

(71) Applicant: Varian Medical Systems, Inc., Palo Alto, CA (US)

(72) Inventors: Ryan Medema, Georgetown, TX (US); Michael Elkins, Austin, TX (US); Eric Hunt, Pflugerville, TX (US); Justin May, Austin, TX (US)

(73) Assignee: Varian Medical Systems, Inc., Palo Alto, CA (US)

( * ) Notice: Subject to any disclaimer, the term of this patent is extended or adjusted under 35 U.S.C. 154(b) by 768 days.

(21) Appl. No.: 17/758,307

(22) PCT Filed: Jun. 10, 2022

(86) PCT No.: PCT/US2022/072884
§ 371 (c)(1),
(2) Date: Jul. 1, 2022

(87) PCT Pub. No.: WO2022/272216
PCT Pub. Date: Dec. 29, 2022

(65) Prior Publication Data
US 2024/0189039 A1 Jun. 13, 2024

Related U.S. Application Data

(60) Provisional application No. 63/213,104, filed on Jun. 21, 2021.

(51) Int. Cl.
*A61B 34/20* (2016.01)
*A61B 18/00* (2006.01)
(Continued)

(52) U.S. Cl.
CPC .............. *A61B 34/20* (2016.02); *A61B 18/02* (2013.01); *A61B 18/1477* (2013.01);
(Continued)

(58) Field of Classification Search
CPC . A61B 34/20; A61B 90/08; A61B 2034/2055; A61B 2090/0807;
(Continued)

(56) References Cited

U.S. PATENT DOCUMENTS

2003/0130711 A1* 7/2003 Pearson ............. A61B 18/1477
607/101
2007/0203455 A1* 8/2007 Tremaglio, Jr. ... A61B 17/3403
604/93.01
(Continued)

FOREIGN PATENT DOCUMENTS

EP 1444962 B1 1/2009
EP 3398543 A1 11/2018
(Continued)

OTHER PUBLICATIONS

International Search Report and Written Opinion issued for PCT Application No. PCT/US2022/072884.
(Continued)

*Primary Examiner* — Benjamin J Klein
*Assistant Examiner* — Thien Jason Tran
(74) *Attorney, Agent, or Firm* — Morgan, Lewis & Bockius LLP; Manita Rawat

(57) ABSTRACT

An ablation probe includes an elongated needle portion comprising a distal end for positioning at a target tissue and a proximal end positioned away from the distal end and a guidance indicator positioned at the proximal end. The guidance indicator includes one or more markings or indicators to identify actual alignment of the probe relative to a preferred alignment.

15 Claims, 16 Drawing Sheets

(51) Int. Cl.
    *A61B 18/02*     (2006.01)
    *A61B 18/14*     (2006.01)
    *A61B 18/18*     (2006.01)
    *A61B 90/00*     (2016.01)

(52) U.S. Cl.
    CPC .......... *A61B 18/1815* (2013.01); *A61B 90/08* (2016.02); *A61B 2018/00577* (2013.01); *A61B 2034/2055* (2016.02); *A61B 2090/0807* (2016.02)

(58) Field of Classification Search
    CPC .......... A61B 2018/00577; A61B 18/02; A61B 18/1477; A61B 18/1815

See application file for complete search history.

(56) References Cited

U.S. PATENT DOCUMENTS

| | | | |
|---|---|---|---|
| 2014/0357986 A1* | 12/2014 | Baldwin | A61B 17/3403 |
| | | | 600/424 |
| 2020/0281503 A1* | 9/2020 | Salamini | A61B 5/068 |
| 2020/0315711 A1* | 10/2020 | Richter | A61B 34/20 |

FOREIGN PATENT DOCUMENTS

| | | | |
|---|---|---|---|
| WO | 9315683 A1 | 8/1993 | |
| WO | WO-9934860 A1 * | 7/1999 | .......... A61N 1/0551 |
| WO | 01095823 A1 | 12/2001 | |
| WO | 2022272216 A1 | 12/2022 | |

OTHER PUBLICATIONS

Extended European Search Report for European Patent Application No. 24153499.9 issued Jul. 2, 2024, 7 pages.

* cited by examiner

ABLATION PROBES WITH GUIDANCE INDICATORS TO SUPPORT LOCATION AND DIRECTION GUIDANCE SYSTEMS

CROSS-REFERENCE TO RELATED APPLICATIONS

This application is a National Stage Application, filed under 35 U.S.C. § 371, of International Patent Application No. PCT/US2022/072884 filed on Jun. 10, 2022 that claims the benefit of U.S. Provisional Application No. 63/213,104, filed on Jun. 21, 2021. The entire disclosures of the above applications are incorporated herein by reference.

TECHNICAL FIELD

The disclosure relates to devices and features of ablation probes to support location and direction guidance systems.

BACKGROUND

Ablation probes are instruments used in medical procedures. During some such medical procedures, the ablation probe can be used to scar, destroy or otherwise treat a target tissue such as a tumor or other abnormal tissue. Ablation procedures can include cryoablation, radio frequency (RF) ablation, microwave ablation and the like. During such procedures using these probes, the probes can be inserted into a subject body and positioned at a desired position relative to the target tissue. Various types of guidance systems can be used to assist medical professionals in the positioning of such probes relative to the target tissue. Examples of such systems can include imaging systems such as ultrasound, magnetic resonance imaging (MRI), computerized tomography (CT), and other systems. In addition, the guidance systems can include other indicators or other guidance tools to assist the medical professional in positioning the probe relative to the target tissue.

Existing ablation probes can be difficult to position relative to the target tissue so as to position the probe in a desired position and to minimize damage and/or proximity to surrounding healthy tissue or other body structures. There exists a need, therefore, for improved ablation probes with complimentary devices and features to allow medical professionals to more effectively position ablation probes in desired positions using guidance tools and imaging systems.

SUMMARY

The methods and apparatuses described herein are directed to embodiments and examples that can be used to position an ablation probe in a preferred location and/or preferred orientation using a guidance system.

In accordance with some embodiments, an ablation probe may include an elongated needle portion comprising a distal end to be positioned at a target tissue and a proximal end positioned away from the distal end. The probe may also include a a guidance indicator located at the proximal end that is aligned with the needle portion.

In one aspect, the guidance indicator may include a planar surface oriented substantially perpendicular to an axis of the needle portion.

In another aspect, the guidance indicator can be removed from the needle portion.

In another aspect, the guidance indicator may include a first marking and a second marking. The second marking is oriented perpendicular to the first marking. The first marking and the second marking are configured to align to one or more lasers of a laser guidance system.

In another aspect, the ablation probe may include a handle coupled to the needle portion at the proximal end, wherein the guidance indicator is positioned on the handle.

In some embodiments, the probe is a cryoablation probe.

In some embodiments, the probe is a radio frequency (RF) ablation probe.

In some embodiments, the probe is a microwave ablation probe.

In another aspect, the guidance indicator may include a target portion connected to an elongated bar and the elongated bar is configured to removably engage with a handle of the probe.

In another aspect, the guidance indicator may include a target portion and a support portion. The support portion may be made of an elastomeric material configured to removably engage the probe via an interference fit.

In another aspect, the guidance indicator may include at least one optical sensor and is configured to determine a predetermined alignment of the probe.

In another aspect, the guidance indicator may include an array of optical sensors and at least one alignment notification, the at least one alignment notification configured to indicate alignment of the probe to a reference of a guidance system.

In some embodiments in accordance with the present disclosure, a guidance indicator for use with an ablation probe is provided. The guidance indicator may include an attachment portion configured to removably attach to the ablation probe and at least one marking connected to the attachment portion. The attachment portion and the at least one marking are positioned such the at least one marking is positioned a predetermined location relative to a needle of the ablation probe when the attachment portion is attached to the ablation probe.

In one aspect, the predetermined location corresponds to an alignment of the at least one marking with a central axis of the needle of the ablation probe.

In another aspect, the attachment portion may include an elastomeric sleeve configured to connect to the ablation probe via an interference fit.

In another aspect, the attachment portion may include an elongated bar and the at least one marking is positioned on a target portion connected to the elongated bar. The elongated bar may be configured to attach to a sleeve of the ablation probe.

In some embodiments of the present disclosure, a method of positioning an ablation probe is provided. The method may include aligning a distal end of the probe relative to a subject using a first reference from a guidance system and aligning a proximal end of the probe relative to the subject using a second reference from the guidance system and a guidance indicator on the probe.

In another aspect, the method may include attaching the guidance indicator to the proximal end of the probe.

In another aspect, the method may include aligning at least one marking on the guidance indicator with the second reference from the guidance system.

In another aspect, the step of aligning the proximal end of the probe may include determining a predetermined alignment using at least one optical sensor in the guidance indicator.

BRIEF DESCRIPTION OF THE DRAWINGS

The features and advantages of the present disclosures will be more fully disclosed in, or rendered apparent by the following detailed descriptions of example embodiments. The detailed descriptions of the example embodiments are to be considered together with the accompanying drawings wherein like numbers refer to like parts and further wherein.

DETAILED DESCRIPTION

Figure 1:
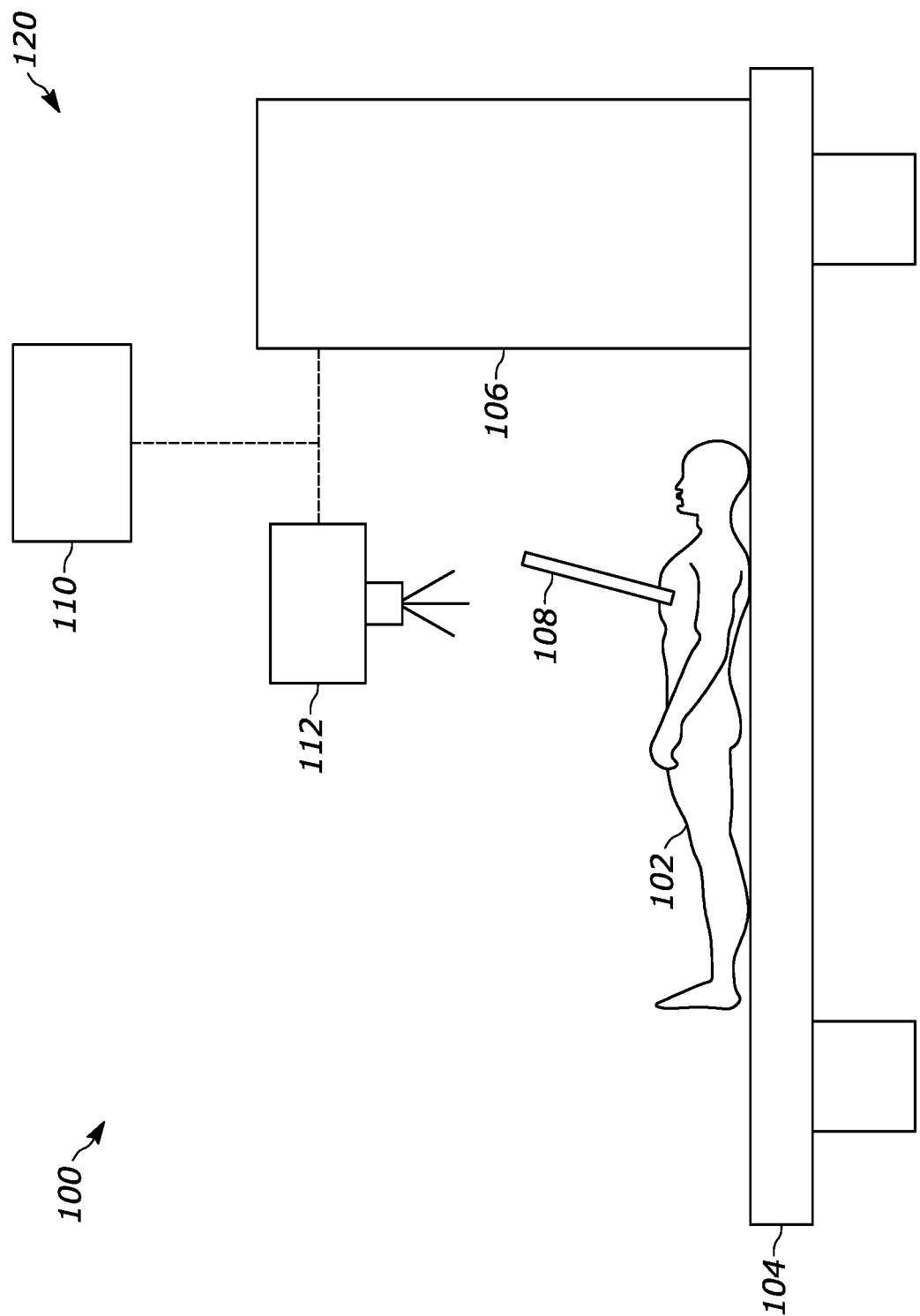
FIG. 1 is an illustration of a subject positioned at a treatment station that includes a probe guidance system.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

In accordance with various embodiments of the present disclosure, an ablation probe is provided that can include a guidance indicator. The guidance indicator can allow a medical professional to align the ablation probe in a predetermined orientation and/or location on a subject to assist the medical professional in guiding the distal end of the probe to a desired location in the subject. Typically, the desired location is at or near a target or abnormal tissue such as a tumor. The guidance indicator that may be included on or can be used in conjunction with the ablation probe can make the alignment and positioning of the ablation probe more easy and more accurate than existing methods and existing probes and related devices.

The ablation probes and/or the guidance indicators of the present disclosure can be used during treatments in which a guidance system is used to align and position the ablation probe. In some example guidance systems, one or more guiding references can be projected or displayed, such as by a laser, on the subject. The medical professional can use the guiding references to position the probe on the subject and then to insert the probe at a desired orientation relative to the subject. The use of such guidance systems can improve the ability of the medical professional to insert the needle of the ablation probe into the subject to position the distal end of the ablation probe at the target tissue. The guidance system can also guide the medical professional to avoid unnecessary or undesirable damage to healthy tissue while the probe is being inserted into the subject.

Referring now to FIG. 1, an example treatment station 100 is shown. A subject 102 can be positioned on a treatment bed 104 during an ablation procedure. The treatment station 100 can include an imaging system 106. The imaging system 106 can be any suitable system or device that can be used to capture images of the subject that can be used to determine a desired location and/or insertion path for the ablation probe 108. The imaging system can be, for example, a computerized tomography (CT) scanner, magnetic resonance imaging (MRI) scanner, x-ray scanner, an ultrasound imaging device or other imaging device. For various types of ablation procedures, different imaging devices may be used.

As further shown, the imaging system 106 can be coupled to a guidance system 120 that can include a computing device 110 and a guidance projector 112. The computing device 110 can be any suitable computer, server, or other device including a processor and memory that can receive data from the imaging device 106 and determine a path and/or positioning for the ablation probe 108 in the subject 102 for a desired treatment. The computing device 110 can be coupled to the guidance projector 112 that can project one or more references onto the subject 102 to assist the medical professional that is performing the treatment procedure. In one example, the guidance projector 112 can include one or more laser that can project a reference such as a line, target, crosshair or other suitable marking onto the subject. The medical professional can then use the one or more references displayed by the guidance projector 112 to position the ablation probe 108 and insert the ablation probe 108 into the subject 102 to perform the treatment. One example of a guidance system 120 is a laser guidance system provided by Siemens that utilizes a software known under the name My-Needle™. The probes and guidance indicators of the present disclosure can be used in conjunction with this system and software as well as other guidance systems.

Figure 2:
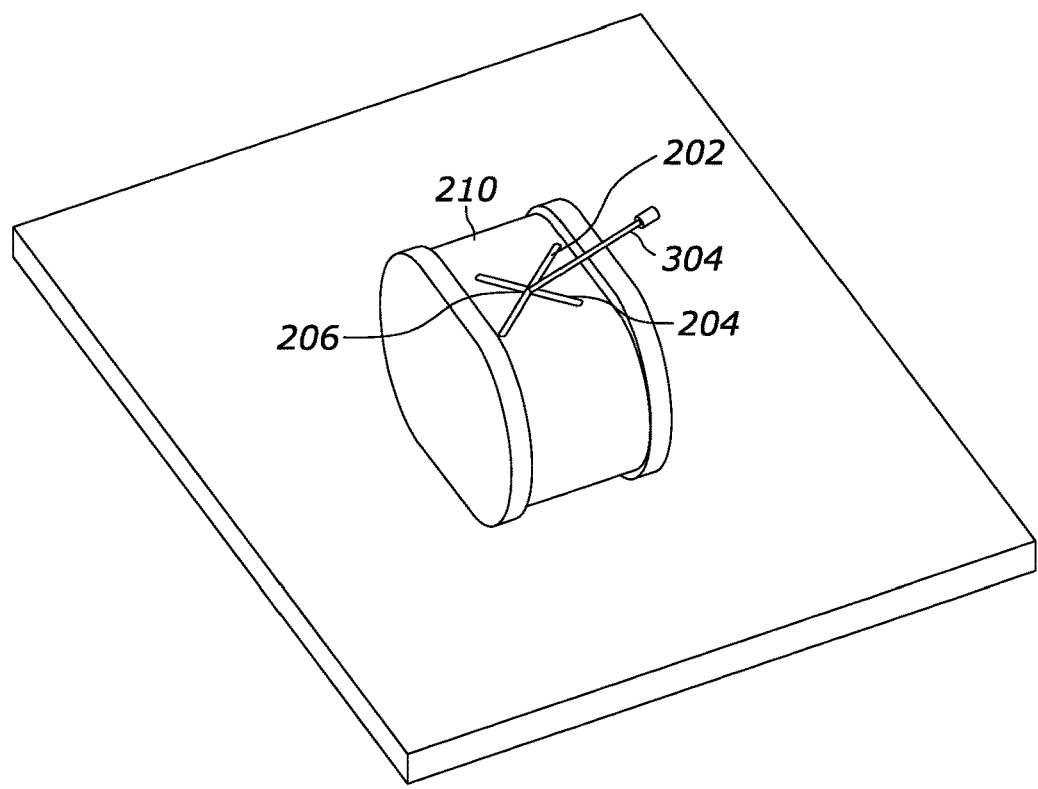
FIG. 2 is an image showing an example first reference for the positioning of a distal end of an ablation probe produced by a probe guidance system.

Referring now to FIGS. 2-5, images of an example guidance system are shown. As shown in FIG. 2, the guidance system can display a first reference 206 onto a subject 210. The subject 210 may be a patient or body structure, for example. In the image shown, the subject 210 is shown as a body analogue for ease of description and illustration purposes only. The first reference 206, in this example, includes a first line 202 and a second line 204 that intersect to form the first reference 206 in the shape of a crosshair. In other examples guidance systems, the first reference 206 can include other markings, targets, symbols or the like. The first reference 206 indicates to the medical professional where the distal end of the ablation probe should be placed for an entrance point on the subject 210.

Figure 3:
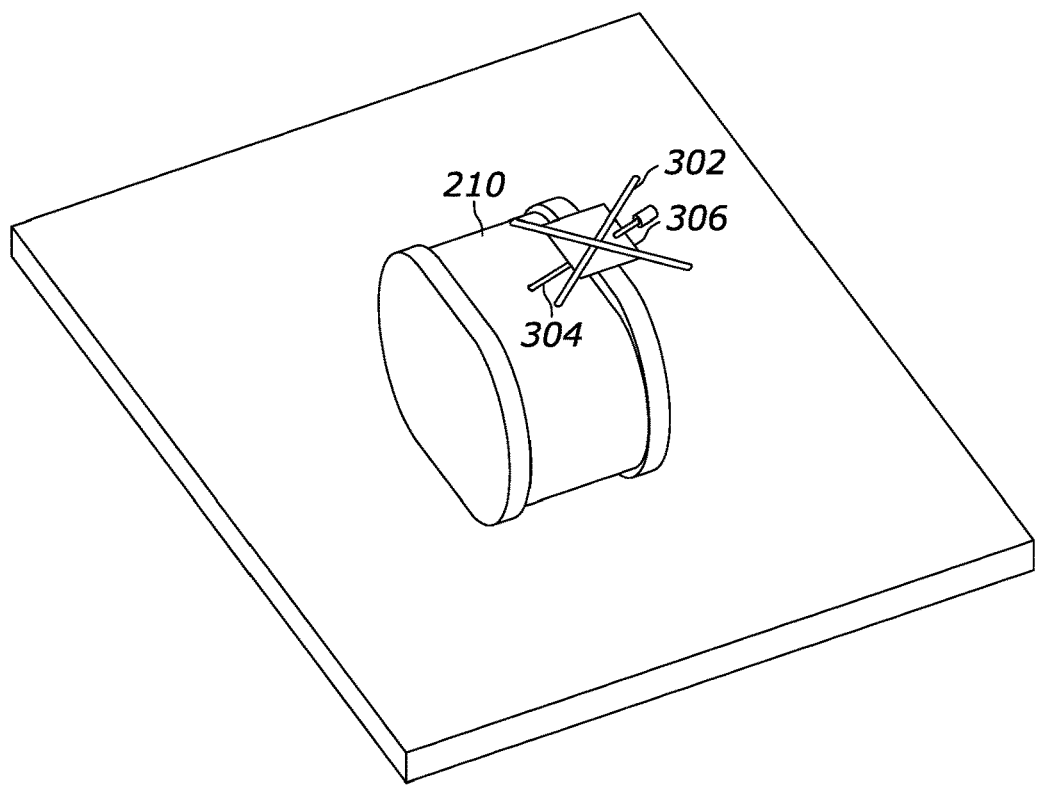
FIG. 3 is an image showing an example second reference for the positioning of a proximal end of an ablation probe produced by the probe guidance system.
Figure 4:
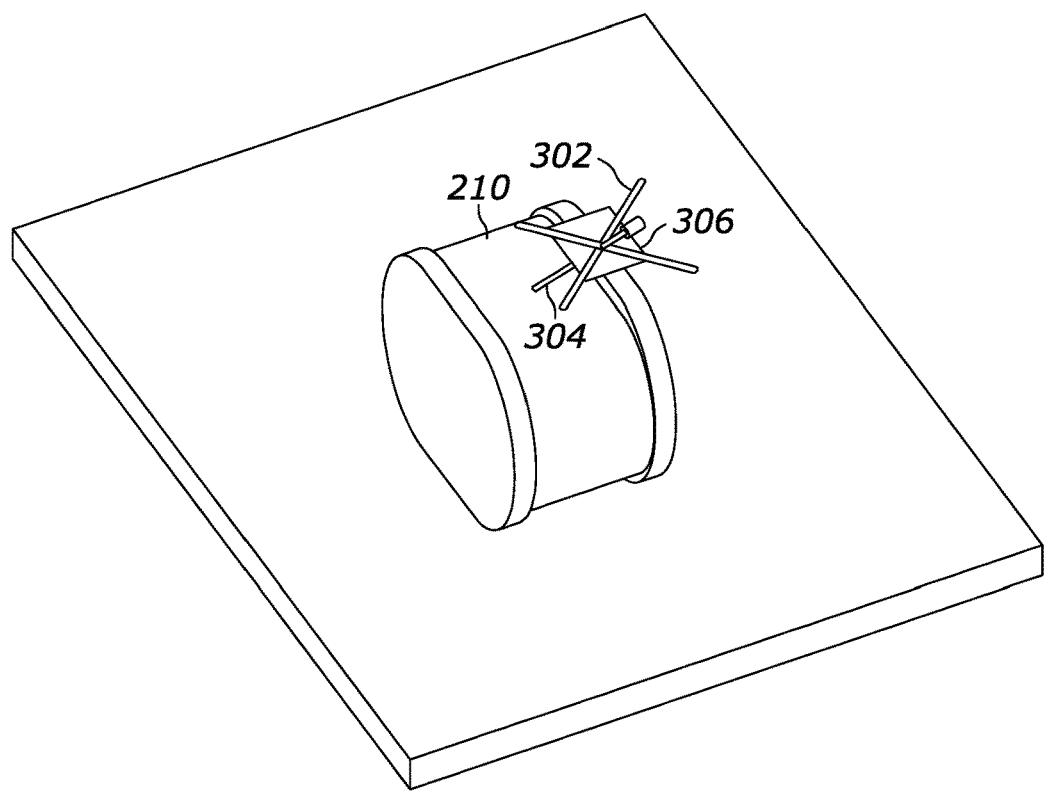
FIG. 4 is an image showing the second reference of FIG. 3 aligned with the proximal end of an ablation probe.

FIG. 3 shows a second reference 302 that can be displayed by the guidance system. The second reference 302 can be configured similarly to the first reference 206 previously described. The second reference 302 can indicate to the medical professional where a proximal end of the ablation probe 304 should be aligned to position the ablation probe at a desired trajectory for insertion of the probe. In the example shown, the probe 304 lacks suitable surface area for alignment so the operator uses a piece of paper or other supplemental surface 306 to align the probe 304 with the second reference 302. FIG. 4 shows the proximal end of the ablation probe 304 aligned with the second reference 302.

Figure 5:
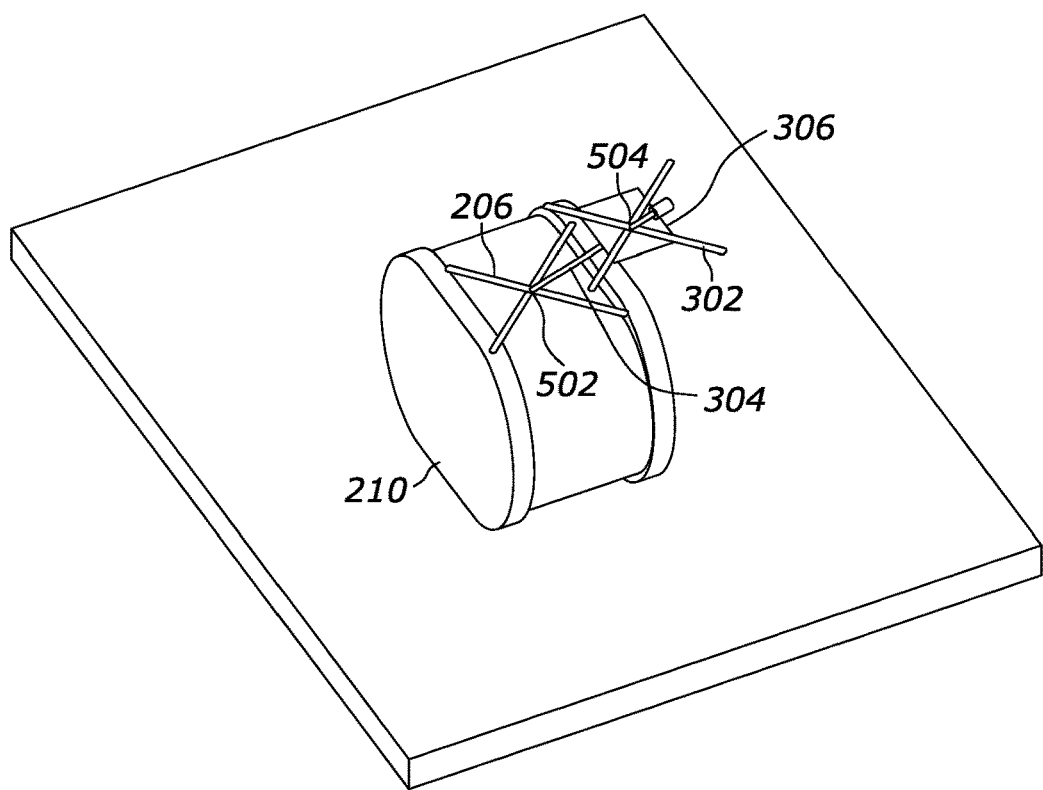
FIG. 5 is an image the first reference aligned with the distal end of the ablation probe and the second reference aligned with the proximal end of the ablation probe in a subject.

Referring now to FIG. 5, the probe 304 has been aligned in a desired position and orientation relative to the subject 210. In the aligned position, the distal end 502 of the probe 304 is positioned and aligned with the first reference 206 and the proximal end 504 of the probe 304 is aligned with the second reference 302.

In addition to an entrance point and or starting position, the guidance system can display additional references and/or provide feedback to a user that the probe 304 is in an intermediate position and/or a final position. The guidance system can use an iterative process to image the subject and/or a position of the probe 304. In this manner, the guidance system can provide additional information to a medical professional regarding a position of the probe relative to the target tissue and/or relative to adjacent tissues and body structures during execution of an ablation procedure.

Many existing ablation probes suffer from drawbacks when used in connection with the guidance systems described above and shown in FIGS. 2-5. Existing ablation probes lack suitable surfaces and/or complimentary features to allow a medical professional to utilize the advanced features and reference displays of guidance systems. For example, many existing ablation probes are not suited to allow a medical professional to easily align the ablation probes with a first reference or a second reference such as the laser crosshair references previously described.

Figure 6:
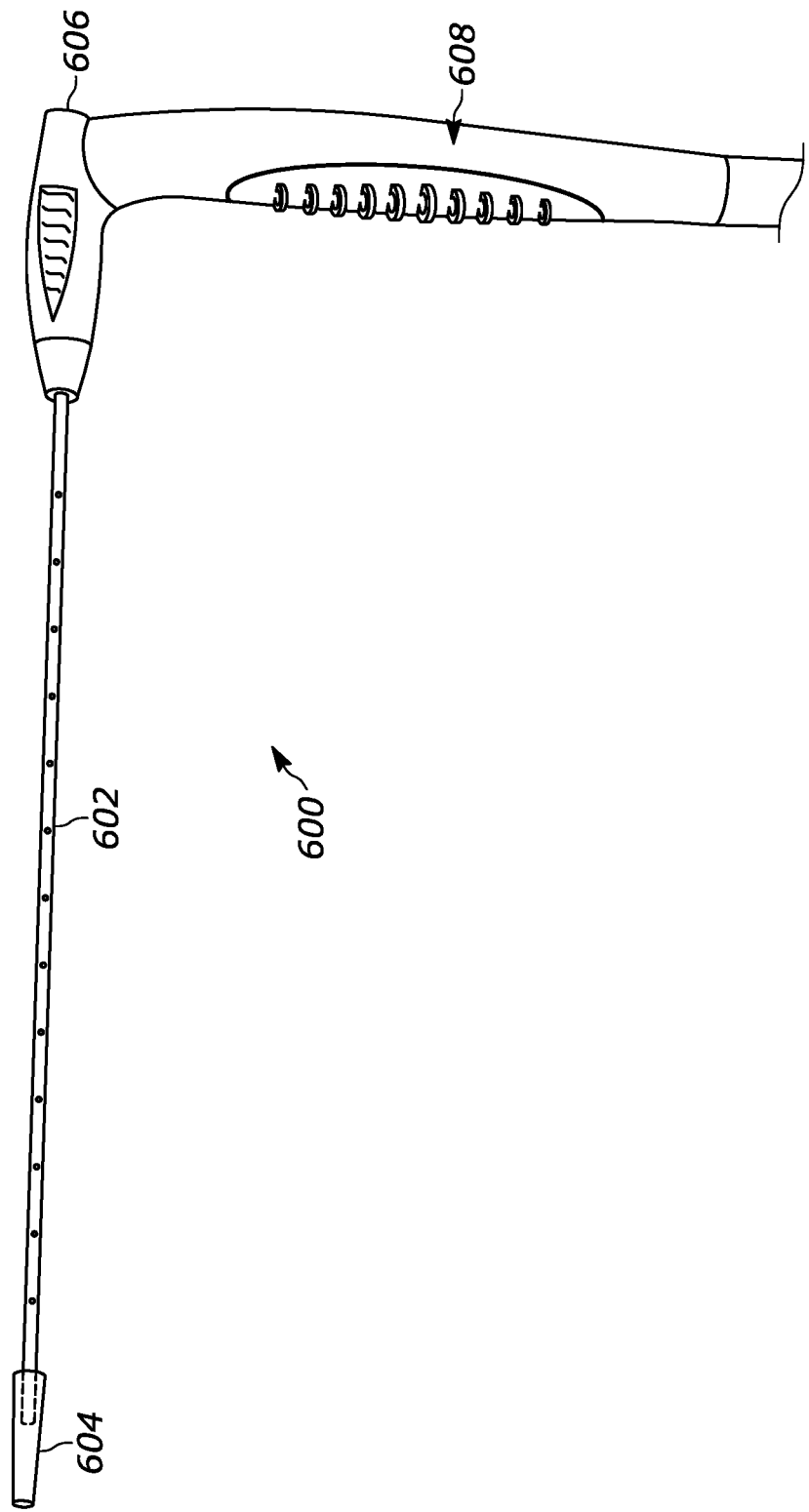
FIG. 6 is an image of an example ablation probe that includes a molded handle.
Figure 7:
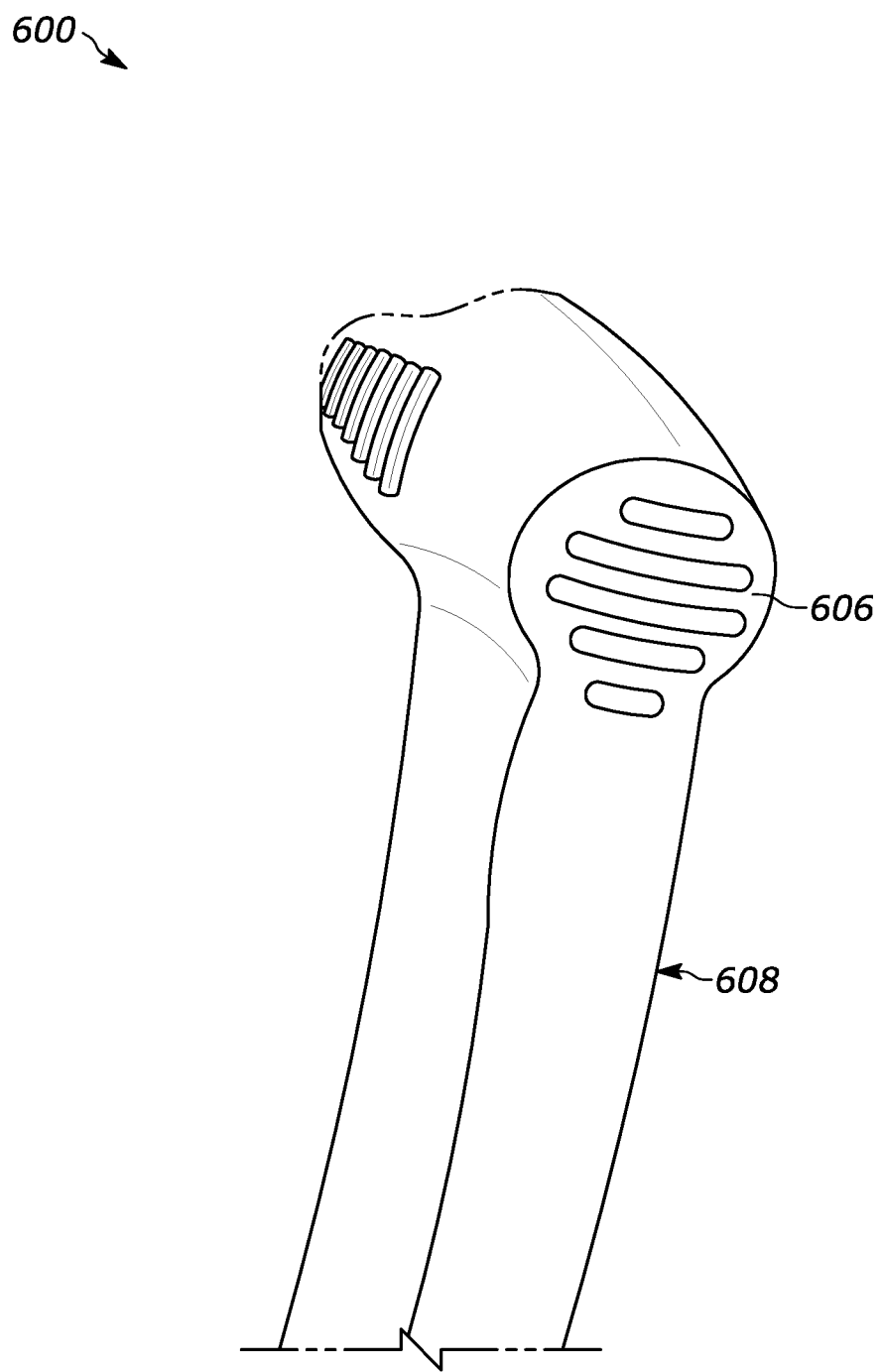
FIG. 7 is an image showing a magnified view of the proximal end of the ablation probe and handle of FIG. 6.

Examples of existing ablation probes are shown in FIGS. 6-9. In some existing examples, as shown in FIGS. 6 and 7, an ablation probe 600 can include a needle 602 with a distal end 604, a proximal end 606 and a molded handle 608. While the proximal end 606 of the probe 600 includes a flattened surface it does not include a center marking or other alignment feature to assist a medical professional in aligning the probe 600 using a guidance system.

Figure 8:
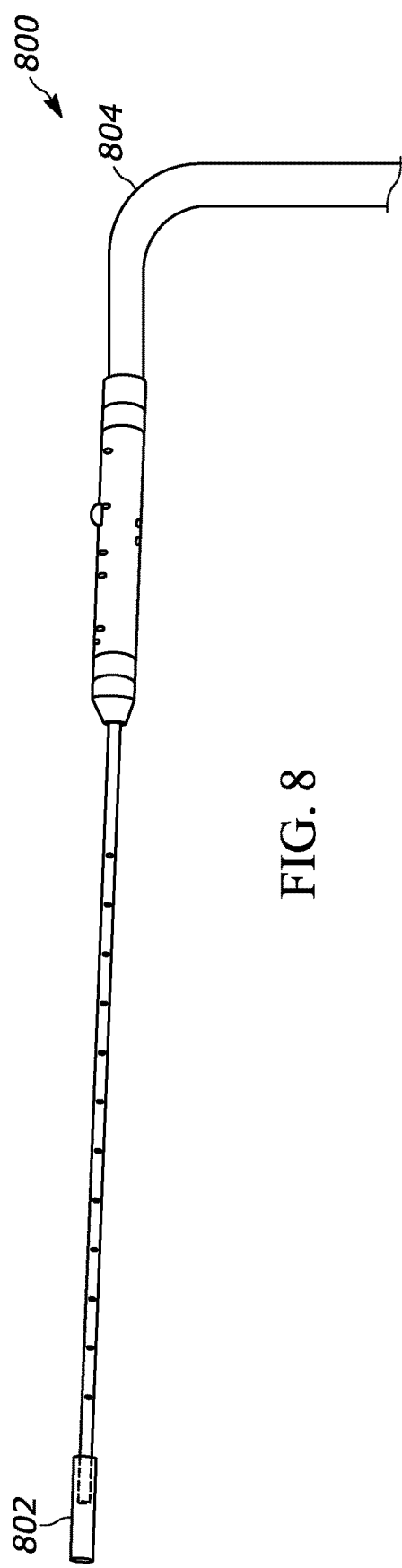
FIG. 8 is an image showing another example ablation probe.
Figure 9:
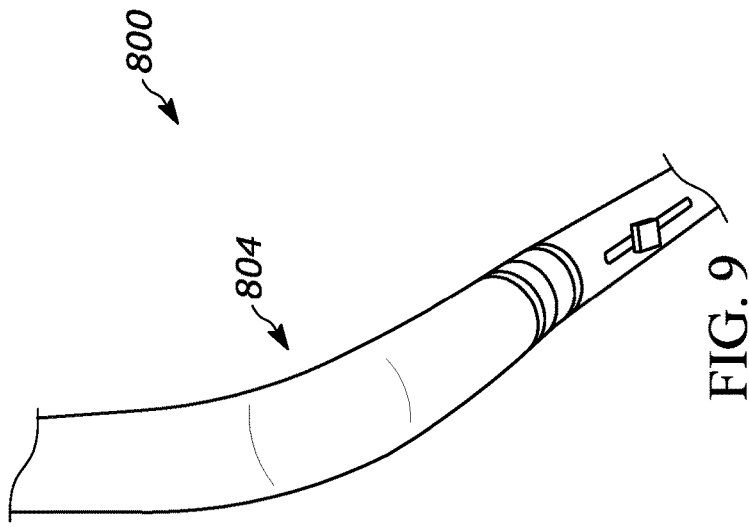
FIG. 9 is an image showing a magnified view of the proximal end of the ablation probe of FIG. 8.

As shown in the example of FIGS. 8-9, an ablation probe 800 can include a distal end 802 and a proximal end 804. In this example, the proximal end 804 of the probe can be formed of bent tubing that may include a cover material or other insulation but does not include a marking or other alignment feature to assist a medical professional in aligning the probe 800 using a guidance system.

The ablation probes of the present disclosure can include a guidance indicator that can be used to align the probe using a guidance system such as the guidance systems previously described. In some examples, the guidance indicator can be formed or marked on the ablation probe. In other examples, the guidance indicator can be attached and removed from the ablation probe as desired during performance of the treatment procedure. The ablation probes and the guidance indicators of the present disclosure are improvements over existing probes and methods of use because the ablation probes and guidance indicators of the present disclosure can be used in conjunction with guidance systems to accurately and reliably position the probe relative to the subject at a desired location and at a desired orientation. Such accurate and reliable positioning can result in improved treatment results such as a greater likelihood of destruction of the target tissue and in a reduced likelihood of damage to surrounding tissue and surrounding body structures.

Figure 10:
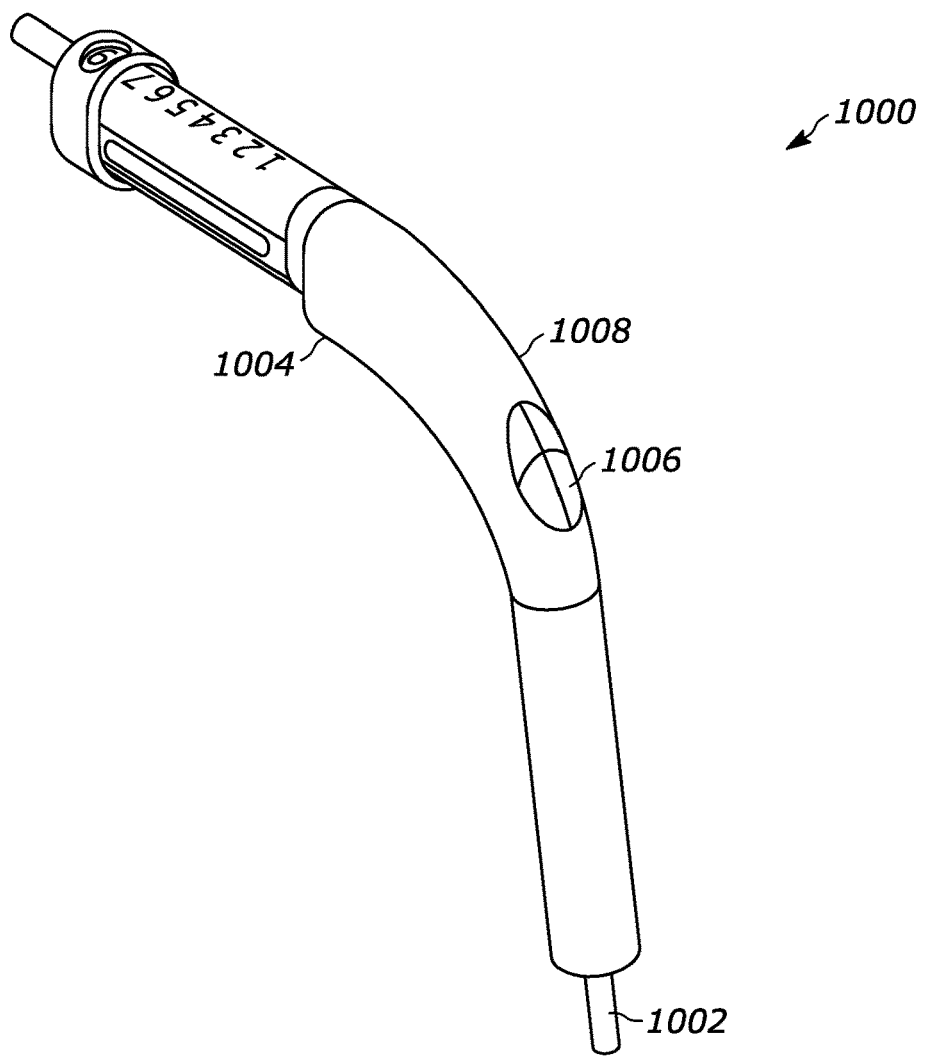
FIG. 10 is an illustration of an example ablation probe with a guidance indicator in accordance with the present disclosure.
Figure 11:
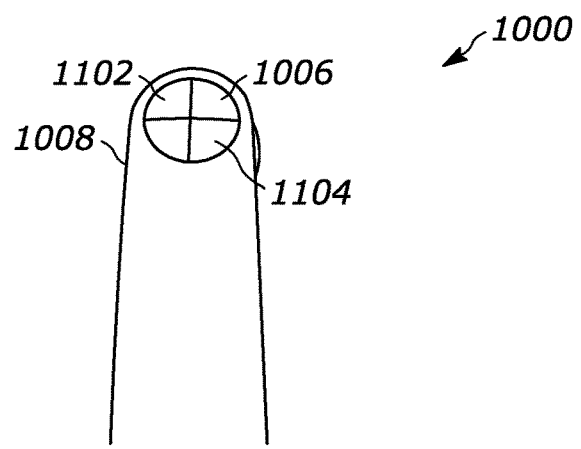
FIG. 11 is a top view of the proximal end of the ablation probe of FIG. 10.

Referring now to FIGS. 10 and 11 an example ablation probe 1000 is shown. The ablation probe 1000 can include a needle 1002 and a handle portion 1004. The needle 1002 can include a distal end (not shown) that can extend away from a proximal end 1008. As further shown, the ablation probe 1000 can include a guidance indicator 1006 that is positioned at the proximal end 1008. The guidance indicator 1006 can be used to align the probe 1000 with or using a reference (e.g., the second reference 302, see FIG. 3) that may be projected or displayed by a guidance system. The guidance indicator 1006 can be printed or otherwise fixed on the handle portion 1004. The guidance indicator 1006 can include a target symbol or other marking that can be aligned with a crosshair indicator. In other examples, the guidance indicator 1006 can have other markings, targets or symbols that can be used to align the probe 1000 with displayed reference of a guidance system.

As further shown in this example, the guidance indicator 1006 can be printed or otherwise configured so that when the guidance indicator 1006 is viewed from a top or plan view (see FIG. 11), the guidance indicator 1006 can appear as one or more perpendicularly oriented markings. For example, the guidance indicator 1006 can be elongated or appear distorted when viewed from the side or from other oblique angle as shown in FIG. 10. When viewed from above, however, the guidance indicator 1006 can show a first marking 1102 and a second marking 1104 that appear as perpendicularly oriented markings as shown in FIG. 11. In other examples, the guidance indicator 1006 can be configured to have other markings that can facilitate use with other reference displays of other guidance systems.

In this example, the guidance indicator 1006 is positioned on a curved or non-planar surface of the ablation probe 1000. The guidance indicator 1006 can be positioned on a surface that curves away from the linear needle 1002 of the ablation probe 1000. In other examples, the guidance indicator 1006 can be positioned on other surfaces or at other locations on the ablation probe 1000. The guidance indicator 1006 can be printed on the handle portion 1004 using a suitable ink or other contrasting material. The guidance indicator can include an ink or other material that can glow or otherwise indicate alignment with a laser reference or other reference a guidance system, such as an iridium ink or material. In other examples, the guidance indicator 1006 can be fixed using adhesive, as a sticker or other suitable attachment. In still other examples, the guidance indicator 1006 can be stamped or integrally formed into the handle portion 1004. In yet other examples, the guidance indicator 1006 can be laser marked and/or embossed or debossed on the surface of the probe 1000.

Figure 12:
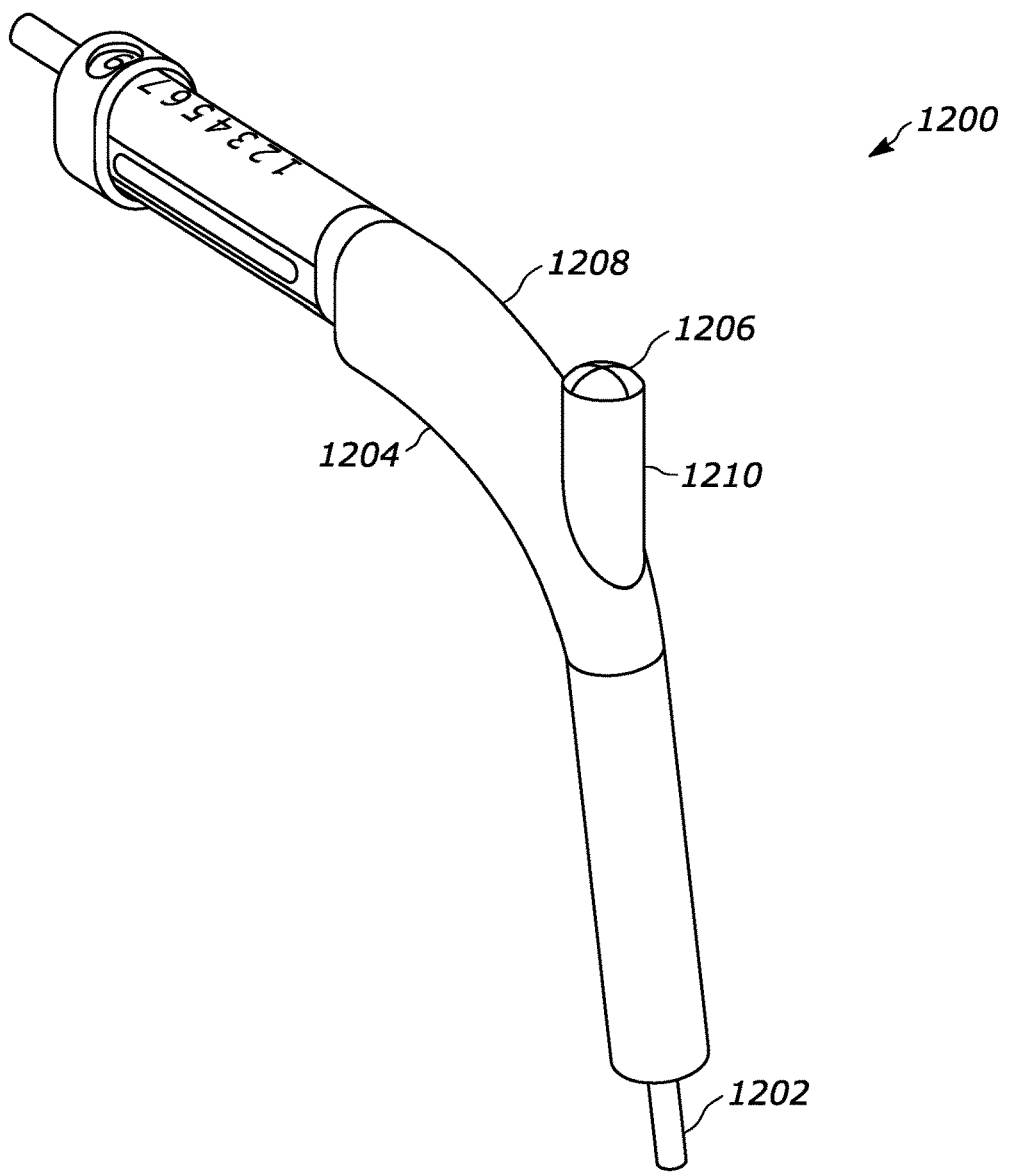
FIG. 12 is an illustration of another example ablation probe with a raised guidance indicator in accordance with the present disclosure.
Figure 13:
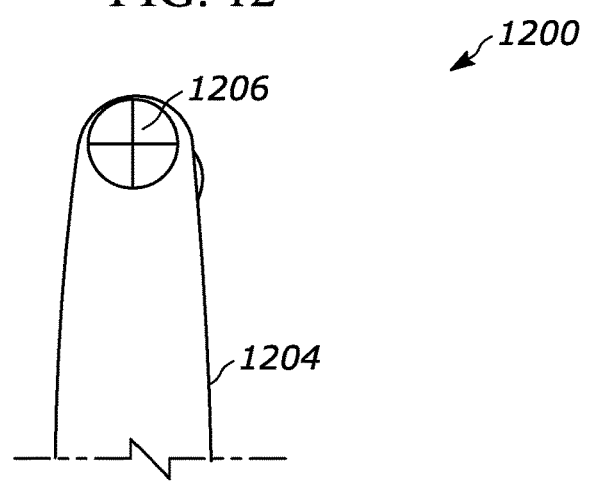
FIG. 13 is a top view of the ablation probe of FIG. 12.
Figure 14:
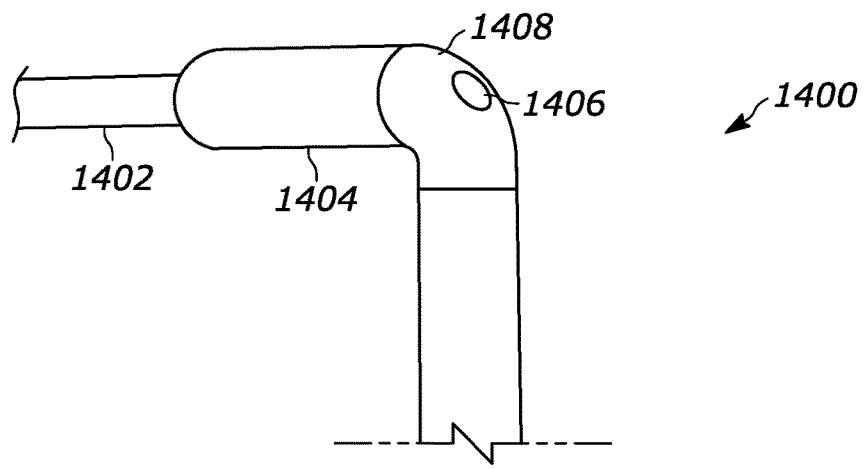
FIG. 14 is an illustration of another example ablation probe with a guidance indicator in accordance with the present disclosure.
Figure 15:
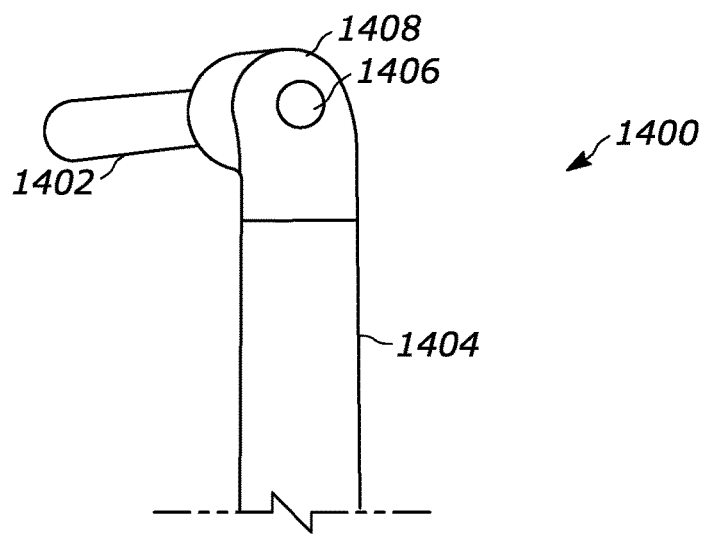
FIG. 15 is another view of the ablation probe of FIG. 15.
Figure 16:
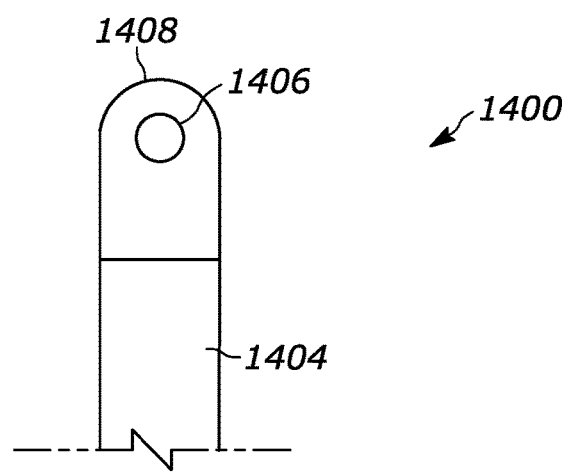
FIG. 16 is a top view of the ablation probe of FIG. 14.

Another example ablation probe 1200 is shown in FIGS. 12 and 13. In this example, the ablation probe 1200 includes a needle 1202 and a handle portion 1204. The ablation probe 1200 can be similar to the ablation probe 1000 previously described. The ablation probe 1200 can include a guidance indicator 1206 positioned at or near a proximal end 1208 of the probe 1200. The guidance indicator 1206, in this example, is positioned on an indicator mount 1210. The indicator mount 1210 orients the guidance indicator 1206 as a desirable orientation and location on the proximal end 1208 of the probe 1200. The indicator mount 1210 can be a raised projection as shown that can include a planar surface. The planar surface of the indicator mount 1210 can be oriented to be parallel to an axis of the needle 1202. The planar surface can also have a normal vector that is positioned perpendicularly to the axis of the needle 1202.

The guidance indicator 1206 can include any suitable marking, crosshair, target, or other symbol that can be used to align the guidance indicator 1206 with the reference displayed by a guidance system. As shown, the guidance indicator 1206 when viewed from the top or in a plan view (FIG. 13) can appear as a circular target with a first marking and a second marking positioned perpendicularly to each other. In other examples, the guidance indicator 1206 can have other appearances and markings.

In the example shown, the indicator mount 1210 is a raised projection that projects outward from the handle portion 1204. In other examples, the indicator mount 1210 can be recessed or debossed into the handle portion 1204 such that a surface of the indicator mount 1210 can still include a planar surface as previously described. The guidance indicator 1206 can be printed, etched or otherwise fixed on the indicator mount 1210 as previously described with respect to guidance indicator 1006.

In another example, an ablation probe 1400 is shown. The ablation probe 1400 can include a needle 1402 and a handle portion 1404. The handle portion can be a molded handle, a sleeve of material or a cover for the needle 1402, tubing, wires or other internal elements of the probe 1400. The ablation probe 1400 can include a proximal end 1408 at which a guidance indicator 1406 can be positioned. The guidance indicator 1406 can be similar to the guidance indicator 1006 previously described. In this example, the guidance indicator 1406 is marked as a circular target. The guidance indicator 1406 can be used to position the proximal end 1408 of the probe 1400 in a desired location and/or orientation. The guidance indicator 1406 can be positioned collinearly with the axis of the needle 1402. In this example, the guidance indicator 1406 is positioned on the bent portion of the handle portion 1404.

Figure 17:
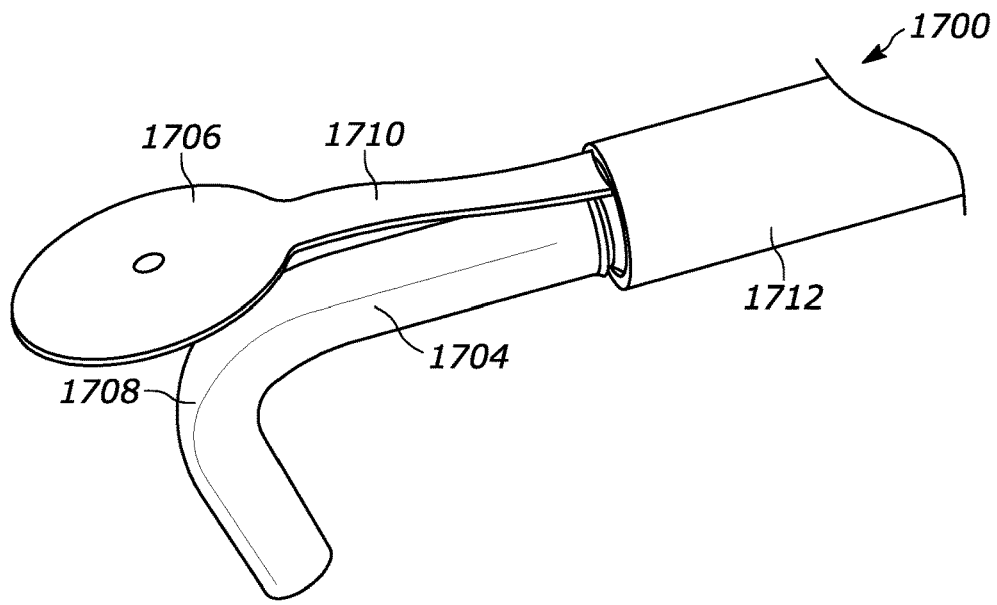
FIG. 17 is an image showing another example ablation probe with another example guidance indicator in accordance with the present disclosure.
Figure 18:
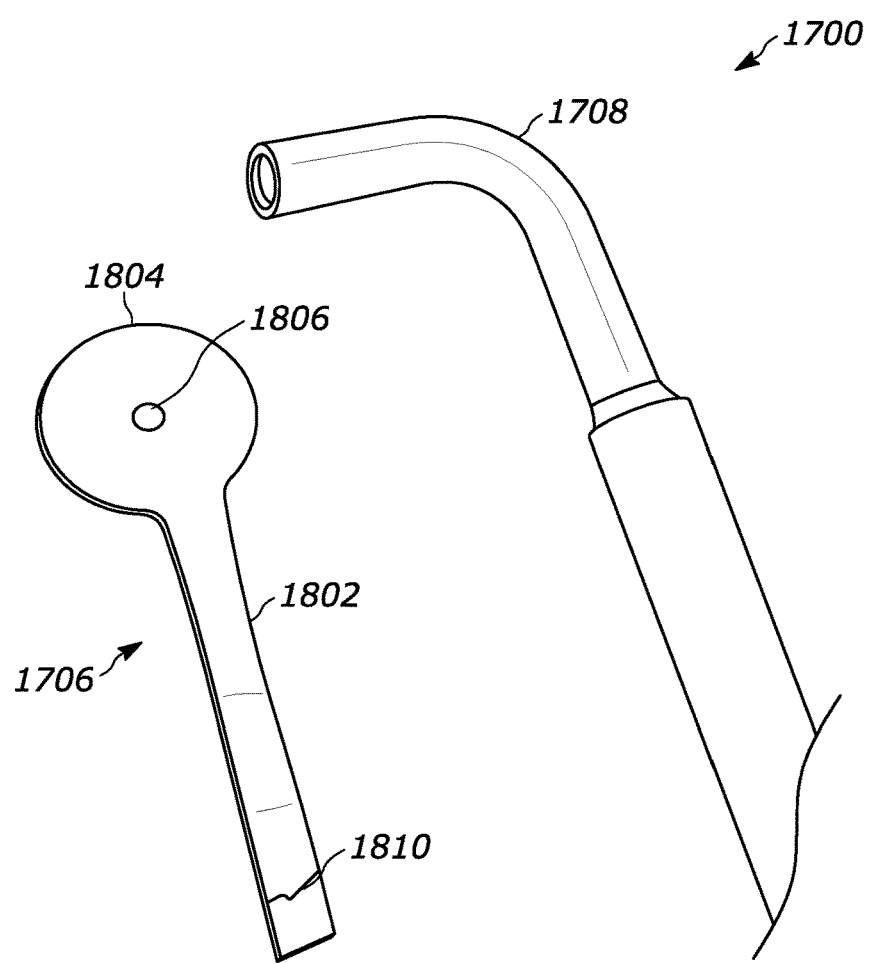
FIG. 18 is an image showing the ablation probe and guidance indicator of FIG. 17 with the guidance indicator removed.

Another example ablation probe 1700 is shown in FIGS. 17 and 18. In this example, the ablation probe 1700 can include a handle portion 1704 and a proximal end 1708. In this example, the probe 1700 typically includes a needle that has been removed in the illustration shown. When included, the needle can extend from the proximal end 1708 to a distal end. The ablation probe 1700, in this example, includes a removable guidance indicator 1706. FIG. 18 shows the example guidance indicator 1706 removed from the ablation probe 1700. The guidance indicator 1706 can include a support portion 1802 and a target portion 1804. The support portion 1802 can support the target portion 1804 and connect the guidance indicator 1706 to the probe 1700. In this example, the support portion 1802 can be configured as an elongated bar of material. The support portion can have an offset 1710 that can position the target portion 1804 at a position that is raised away from the handle portion 1704.

The support portion 1802 can also include connector end 1810 that can connect the guidance indicator 1706 to the probe 1700. In this example, the connector end 1810 can be received in a sleeve 1712 of the probe 1700 to hold the guidance indicator in a desired position. In other examples, the support portion 1802 can include one or more clips, collars, pins, sleeves or other connecting features that can connect the guidance indicator 1706 to the probe 1700.

The target portion 1804 can be connected to the support portion 1802 and can be configured to include a target marking 1806 or other marking that can be used to align the probe 1700 using one or more references that can be displayed by a guidance system. In this example, the target portion 1804 can have a circular shape and the target marking 1806 can be configured as a dot or other centering marking. In other examples, the target portion 1804 can other shapes or profiles such as rectangular, diamond, oval, cross or other suitable shape. The target marking 1806 can also have other shapes or configurations and can include one or more targets, lines, symbols or other markings to align with the reference of the guidance system. The target marking 1806 can be printed, connected, stamped, etched, laser marked, embossed, debossed or otherwise fixed to the target portion 1804, including using other methods or processes previously described.

The target portion 1804 can be removably connected and positioned relative the probe 1700 such that the target portion and/or the target marking 1806 is positioned at the proximal end 1708 of the probe 1700. The target portion 1804 and/or the target marking 1806 can be further located and oriented such that the target marking 1806 is aligned with an axis of the needle (or collinearly with the needle) of the probe 1700. Guidance indicator 1706 in this example can be removed and reused during multiple ablation procedures and can be interchangeable with various ablation probes. In addition, the ablation probe 1700 can include complimentary attachment points (not shown) such as recesses, holes, pins or the like that can be used to connect and locate the guidance indicator 1706 to the probe 1700.

The guidance indicator 1706 in this example can be made of various suitable materials. In some examples, the guidance indicator 1706 can be made of a plastic material that can be molded to have a suitable shape and configuration as previously described. In other examples, the guidance indicator 1706 can be made of other materials such as metals, alloys, composites and other combinations thereof.

Figure 19:
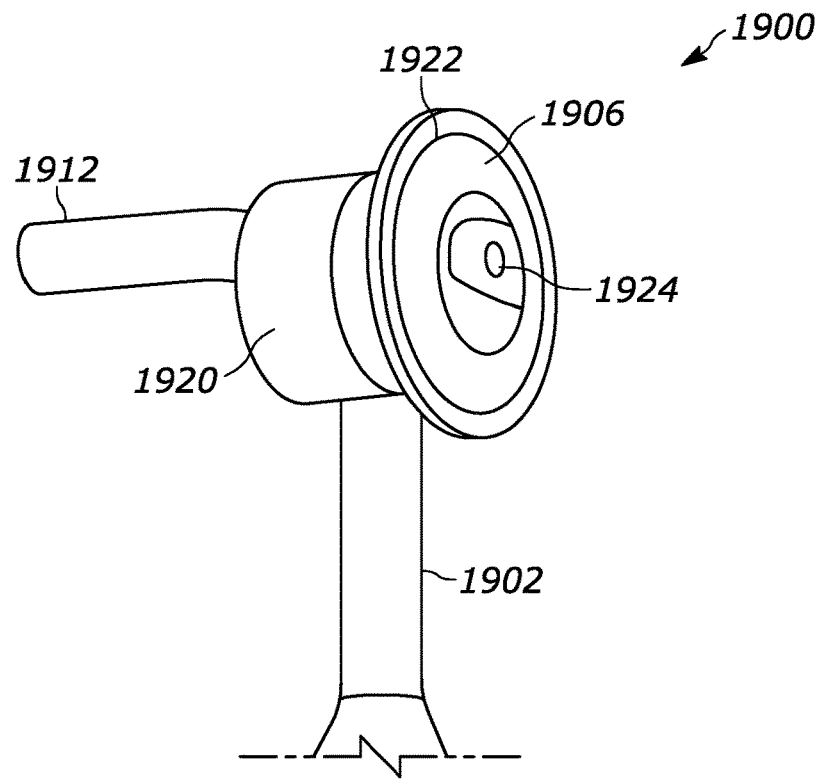
FIG. 19 is an image showing another example ablation probe with another example guidance indicator in accordance with the present disclosure.
Figure 20:
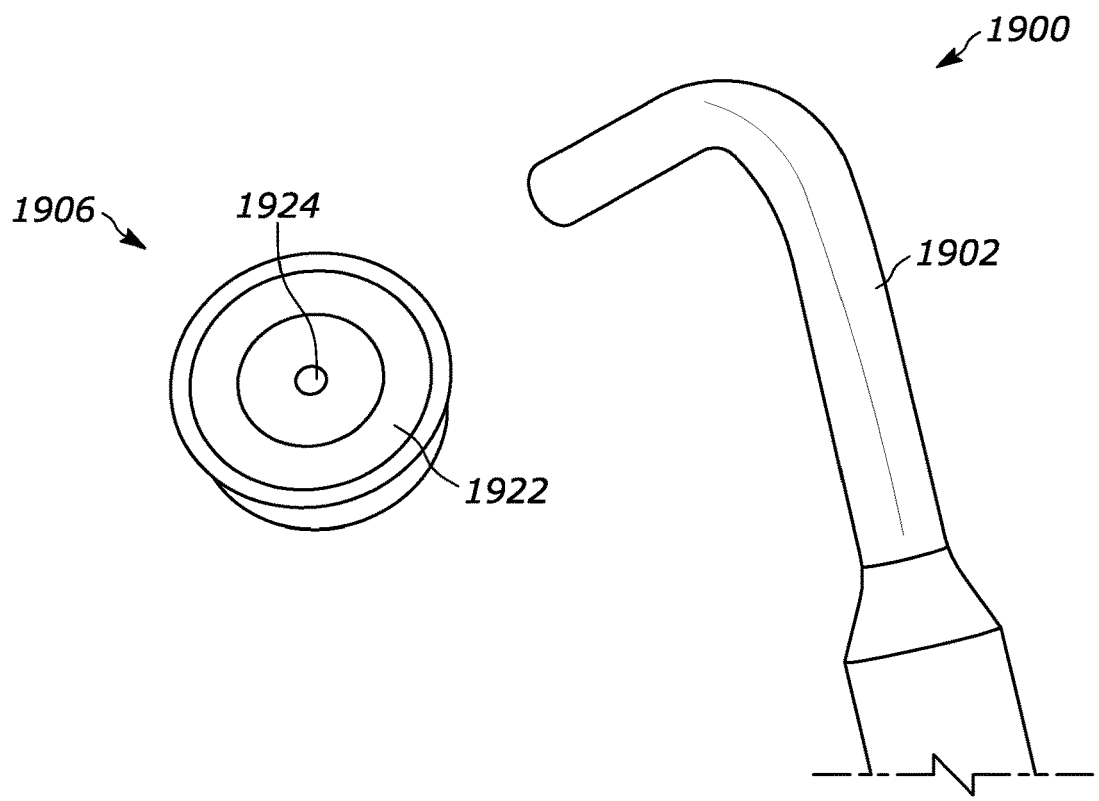
FIG. 20 is an image showing the ablation probe and guidance indicator of FIG. 19 with the guidance indicator removed.

Another example ablation probe 1900 is shown in FIGS. 19 and 20. In this example shown, the probe 1900 includes a handle portion 1902 with a proximal end 1908. When the probe 1900 is in use, a needle can extend from the end 1912 shown. In this example, the probe 1900 includes a guidance indicator 1906 mounted to the proximal end 1908. The guidance indicator 1906 can be removable from the probe 1900. The guidance indicator 1906 can include a mount portion 1920 and a target portion 1922. The mount portion 1920 can be a cylindrically shaped support that can include a sleeve, groove or channel into which the handle portion 1902 (or other portion of the probe 1900) can be received to hold the guidance indicator 1906 in a desired position relative to the needle of the probe 1900. The sleeve, groove or channel or other attachment feature of the mount portion 1920 can be sized such that the guidance indicator is removable from the probe 1900 but is securely fixed to the probe 1900 during use. An interference fit or other suitable dimensional relationship between the mount portion 1920 and the probe 1900 can be used in one example. In other examples, the mount portion 1920 and/or the probe 1900 can include complimentary attachment points (not shown) such as recesses, holes, pins or the that can be used to connect and locate the guidance indicator 1906 to the probe 1900.

The guidance indicator 1906 can also include a target portion 1922.

The target portion 1922 can be similarly configured as the target portion 1904 previously described. The target portion can include a target marking 1924. The target marking 1924 can be similarly configured as the target marking 1806 previously described. In the example shown, the target marking 1924 can include a centering mark that can be located collinearly with the needle of the probe 1900 at the proximal end 1908.

The guidance indicator 1906 can be made of any suitable material such as a plastic. In one example, the guidance indicator 1906 can be made of an elastomeric material that can elastically deform. Such a property of the material of the guidance indicator 1906 can allow the mount portion 1920 to deform when the tubing of the probe 1900 is inserted into the attachment channel, groove or sleeve of the mount portion 1920. In this manner, the guidance indicator 1906 can be sized and configured to fit on a variety of probes 1900.

Referring now to FIGS. 26-29, another example guidance indicator 2600 is shown. The guidance indicator 2600 can be removable from a probe 2702. The guidance indicator 2600 can have an outer profile of various suitable shapes. In the example shown, the outer profile has a rounded or circular shape. The guidance indicator 2600 can be planar such that it presents a surface 2602 on which laser references of a guidance system can be projected. In this manner, the guidance indicator 2600 can allow a medical professional to easily and accurately position and align the probe 2702 in a desired location and orientation relative to a patient or subject.

As shown, the guidance indicator 2600 can also include a channel 2604. The channel 2604 can be sized to allow a probe 2702 to be positioned in the channel 2604. The channel 2604 may extend from an edge of the guidance indicator 2600 to a center of the guidance indicator 2600. When the probe 2702 is positioned in the guidance indicator 2600 (FIG. 27), the proximal end 2708 of the probe 2702 is positioned at the center of the guidance indicator 2600. The channel 2604 may have a rib or groove that can be sized to fit with a corresponding groove or rib on the probe 2702. Such a feature can locate the guidance indicator 2600 in a predetermined position relative to the probe 2702. The channel 2604 may be sized so as to to have an interference fit with one or more portions of the probe 2702 to retain the guidance indicator 2600 in a desired position relative to the probe 2702. In addition, the probe 2702 and/or the guidance indicator 2600 may include a clip, tab, barb, or other retention feature to retain the guidance indicator 2600 in a desired position relative to the probe 2702.

The probe 2702 may include a first marking 2710 and/or a second marking 2712. The first marking 2710 and/or the second marking 2712 can be various suitable indicators that are marked, embossed, debossed, printed, formed, or otherwise fixed on the probe 2702 to allow references from the guidance system to be used to align the probe 2702. The first marking 2710 and the second marking 2712 can be extended from the probe 2702 and on the guidance indicator 2600. When the guidance indicator 2600 is assembled to the probe 2702, the markings of the probe can be aligned with markings on the guidance indicator 2600. The markings may be a target shape, a plus-sign shape, a cross-hair, a target symbol, or the like.

Figure 27:
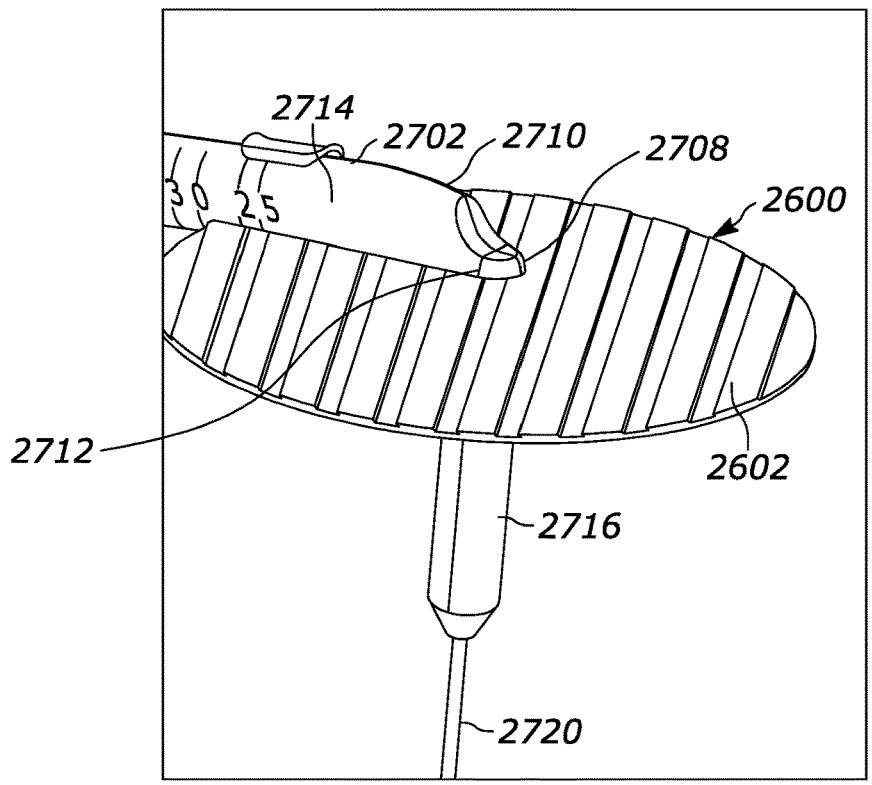
FIG. 27 is an illustration of an example ablation probe with the guidance indicator of FIG. 26.

In the example shown in FIG. 27, the probe 2702 is a right-angle probe in which a first portion 2714 of the handle is at a right angle to the second portion 2716 of the handle. The second portion 2716 of the handle is aligned with the needle 2720 that may be inserted into a subject during a treatment. The guidance indicator 2600 may be aligned with the first portion 2714 of the probe 2702. In this configuration, the surface 2602 of the guidance indicator 2600 is positioned substantially perpendicularly to the needle 2720. This provides a large surface on which the references of the guidance system can be projected in order to align the needle 2720 in a desired position and orientation relative to a subject.

Figure 28:
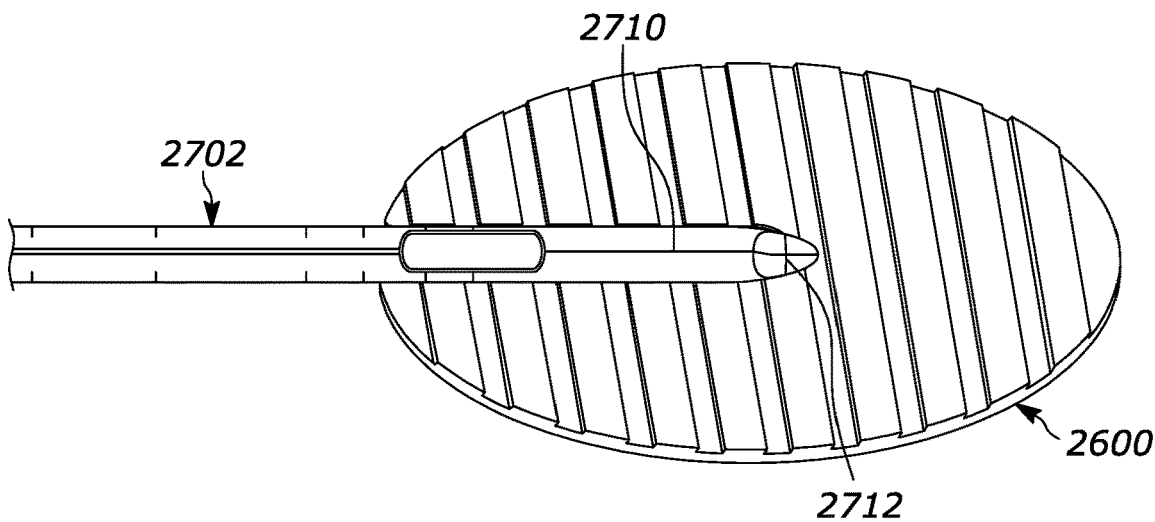
FIG. 28 is a plan view of the example ablation probe and guidance indicator of FIG. 27.
Figure 29:
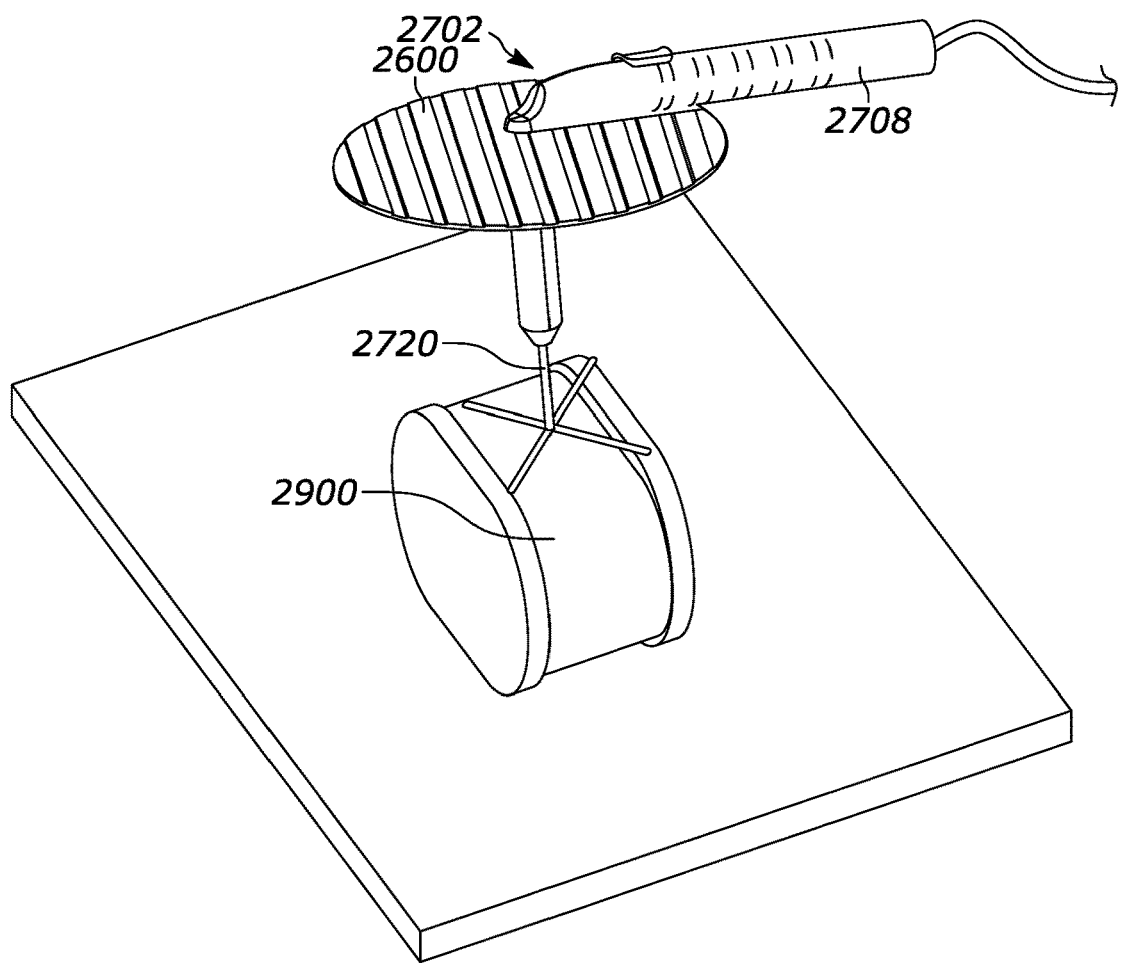
FIG. 29 is an illustration of the example ablation probe and guidance indicator of FIG. 27 shown being aligned with a guidance system.

A plan view of the probe 2702 with the guidance indicator 2600 is shown in FIG. 28. As can be seen, the first marking 2710 and the second marking 2712 can be easily seen by a user in order to position the probe 2702 in a desired location and orientation. During an example procedure (FIG. 29), the distal end (i.e., the end that is first inserted into a subject during treatment) of the needle 2720 can be positioned at a location that is indicated by a guidance system. As previously described, the guidance system may, for example, project a first reference in the form of an "X", cross hairs, or other target onto the subject 2900. The distal end of the needle 2702 can be positioned at the first reference of the guidance system. The proximal end 2708 of the probe 2702 can then be aligned, with the assistance of the guidance indicator 2600, to the second reference 2502 of the guidance system. The surface of the guidance indicator 2600 allows for a user to easily view the reference from the guidance system and move the proximal end 2708 of the probe 1702 to the desired position.

The guidance indicator 2600 can be made of various suitable materials such a suitable polymer, composite or other material. The outer profile of the guidance indicator 2600 can have a rounded, circular, or elliptical shape. In other examples, the guidance indicator 2600 can have other outer profiles and shapes. The guidance indicator 2600, in this example, is configured to be used with a right angle probe but other configurations of the guidance indicator 2600 can also be used that are configured with other probes other than right angle probes as shown.

Turning now to FIGS. 21-24, more example ablation probes are shown.

In many of the previous examples, the ablation probes were shown as cryoprobes that can be cooled to temperatures less than the freezing temperature of the target tissues to cause ice balls to be created that freeze and/or destroy the target tissue. The teachings and principles of the present disclosure, including the ablation probes and the guidance indicators described, can be used in various types of ablation probes including cryoprobes, RF (Radio Frequency) probes, microwave probes and other probe types. The examples shown in FIGS. 21-24 are shown as microwave ablation probes. It should be appreciated, however, that the features and descriptions are not limited to microwave ablation probes.

Figure 21:
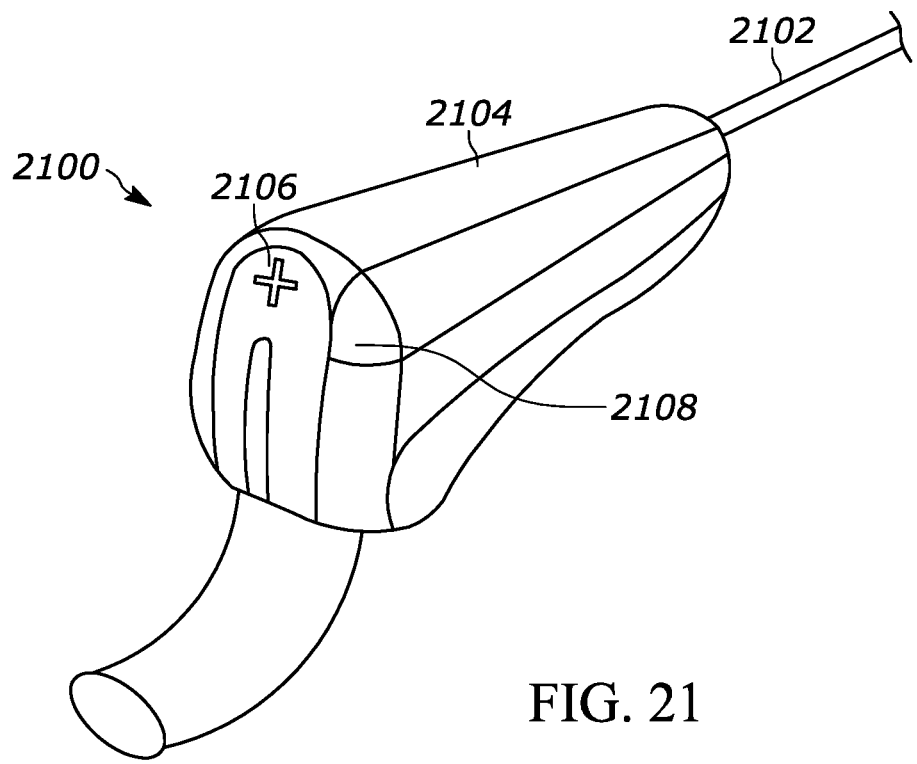
FIG. 21 is an illustration of another example ablation probe and guidance indicator in accordance with the present disclosure.

As shown in the FIG. 21, an example ablation probe 2100 is shown.

The example probe 2100 includes a needle 2102, a handle portion 2104 and a guidance indicator 2106 located at a proximal end 2108. The guidance indicator 2106 can include any suitable marking to allow the needle 2102 to be aligned with one or more references that can be displayed by a guidance system. The guidance indicator 2106, in this example, includes a crosshair symbol that can be aligned with multiple indicators of the reference of the guidance system. The guidance indicator 2106 can be formed, printed, connected or otherwise included on the handle portion 2104. In other examples, the guidance indicator 2106 can have other shapes, symbols or markings as may be desirable.

Figure 22:
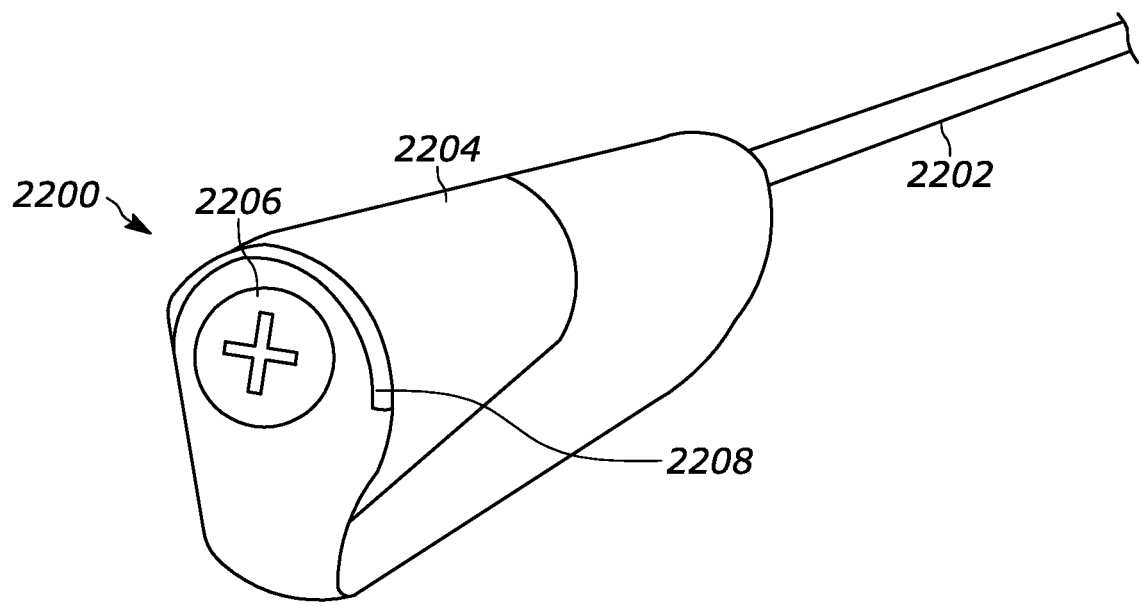
FIG. 22 is an illustration of another example ablation probe and guidance indicator in accordance with the present disclosure.

As shown in FIG. 22, an example ablation probe 2200 is shown. The example probe 2200 includes a needle 2202, a handle portion 2204 and a guidance indicator 2206 located at a proximal end 2208. The guidance indicator 2206 can include any suitable marking to allow the needle 2202 to be aligned with one or more references that can be displayed by a guidance system. The guidance indicator 2206, in this example, includes a crosshair symbol that can be aligned with multiple indicators of the reference of the guidance system. The guidance indicator 2206 can be formed, printed, connected or otherwise included on the handle portion 2204. In other examples, the guidance indicator 2206 can have other shapes, symbols or markings as may be desirable.

Figure 23:
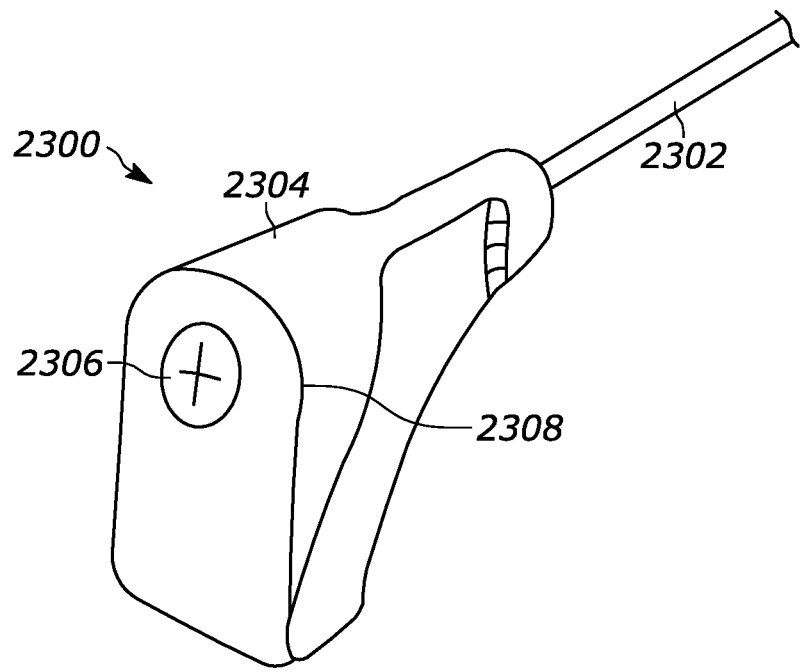
FIG. 23 is an illustration of another example ablation probe and guidance indicator in accordance with the present disclosure.

As shown in the FIG. 23, an example ablation probe 2300 is shown.

The example probe 2300 includes a needle 2302, a handle portion 2304 and a guidance indicator 2306 located at a proximal end 2308. The guidance indicator 2306 can include any suitable marking to allow the needle 2302 to be aligned with one or more references that can be displayed by a guidance system. The guidance indicator 2306, in this example, includes a crosshair symbol that can be aligned with multiple indicators of the reference of the guidance system. The guidance indicator 2306 can be formed, printed, connected or otherwise included on the handle portion 2304. In other examples, the guidance indicator 2306 can have other shapes, symbols or markings as may be desirable.

Figure 24:
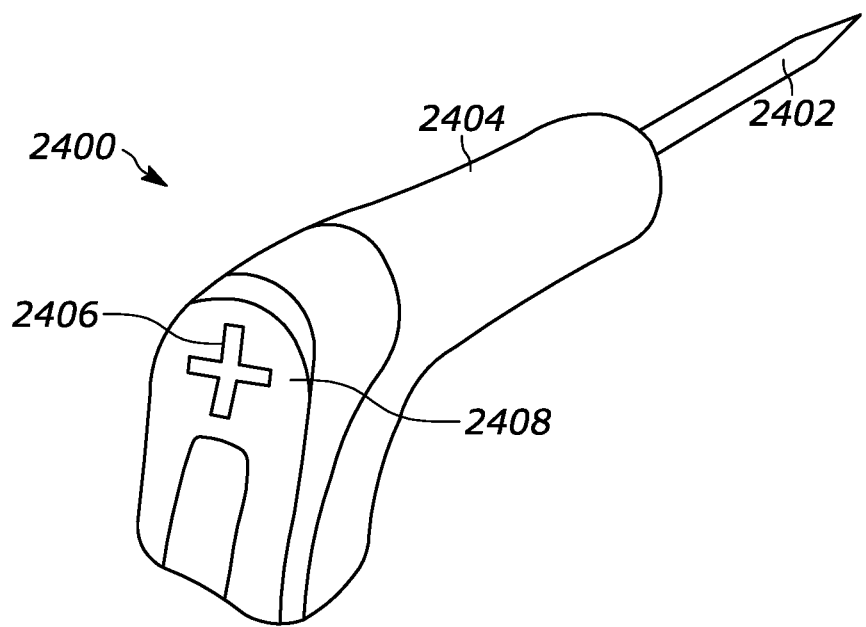
FIG. 24 is an illustration of another example ablation probe and guidance indicator in accordance with the present disclosure.

As shown in FIG. 24, an example ablation probe 2400 is shown. The example probe 2400 includes a needle 2402, a handle portion 2404 and a guidance indicator 2406 located at a proximal end 2408. The guidance indicator 2406 can include any suitable marking to allow the needle 2402 to be aligned with one or more references that can be displayed by a guidance system. The guidance indicator 2406, in this example, includes a crosshair symbol that can be aligned with multiple indicators of the reference of the guidance system. The guidance indicator 2406 can be formed, printed, connected or otherwise included on the handle portion 2404. In other examples, the guidance indicator 2406 can have other shapes, symbols or markings as may be desirable.

While the guidance indicators 2106, 2206, 2306, 2406 are shown as marked on the respective handle portions, the guidance indicators can otherwise be printed, marked, stamped, embossed, debossed or inlaid on the handle or other portion of the probe for facilitation of the alignment of the guidance indicators with the reference displays of various guidance systems.

Figure 25:
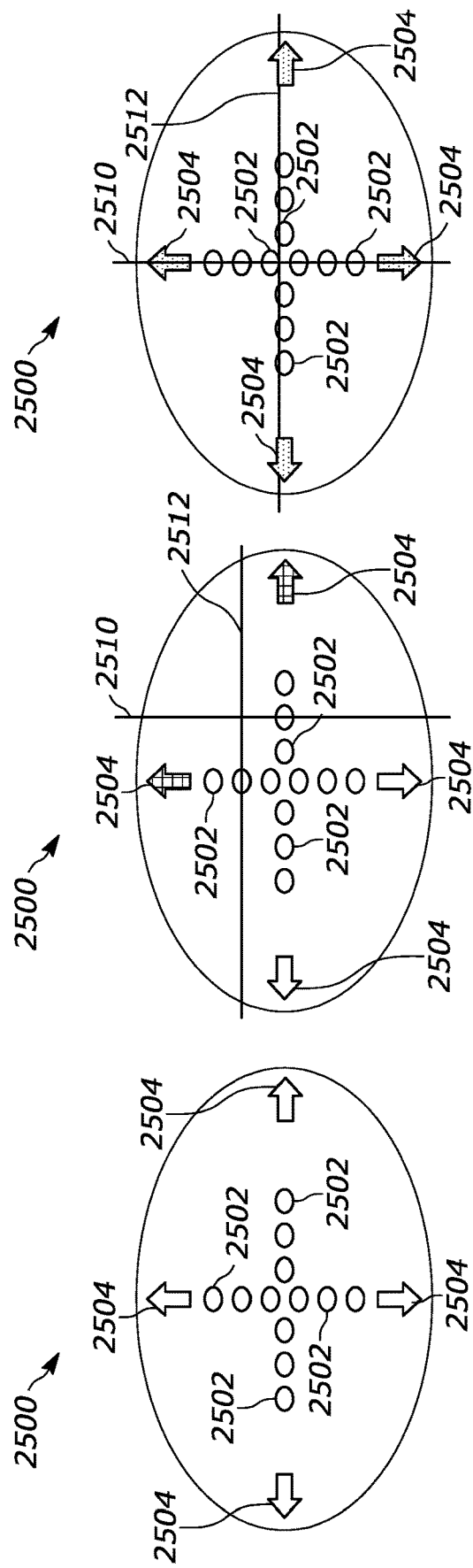
FIG. 25A is an illustration of an example guidance indicator in accordance with the present disclosure.
FIG. 25B is an illustration of the guidance indicator of FIG. 25A showing misalignment with a reference of a guidance system.
FIG. 25C is an illustration of the guidance indicator of FIG. 25A showing alignment with a reference of a guidance system.
Figure 26:
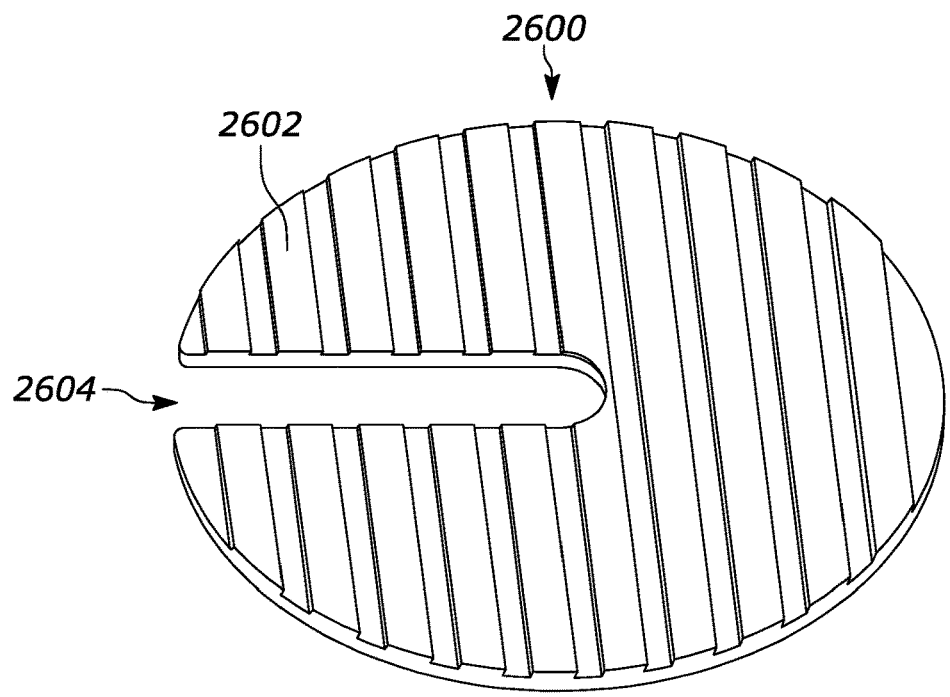
FIG. 26 is an illustration of another example guidance indicator in accordance with the present disclosure.

Referring now to FIGS. 25A-25C, another example guidance indicator 2500 is shown. The guidance indicator 2500 can used in any of the previously described ablation probes or incorporated into and in combination with any of the features of the guidance indicators previously described. The guidance indicator 2500 can be positioned on a permanently integrated guidance indicator or be incorporated into a removable guidance indicator such as guidance indicators 1706, 1906. The guidance indicator 2500 can be positioned at a proximal end of an ablation probe and can be aligned with an axis of the needle of the probe or be collinearly aligned with the needle of the probe.

As shown, the guidance indicator 2500 can include an array of photo sensors 2502. The photo sensors 2502 can be configured in an array or other pattern that can be coordinated with a pattern or shape of the reference that can be displayed by the guidance system. In the example shown, the array of photo sensors is arranged in a cross shape to coordinate with the crosshair pattern of the reference displayed by the guidance system, such as the second reference 302 (FIG. 3) previously described. In other examples, the array of photo sensors can have other shapes or patterns such as a bullseye and target pattern, one or more concentric circles, an x-pattern or the like.

The photo sensors 2502 can be any suitable sensor that can detect an alignment of the reference of the guidance system. For example, the photo sensors 2502 can be photo cells or other optical sensors that can detect an alignment of a laser light of the second reference 302 (FIG. 3) of the guidance system 120. In other examples, other suitable sensors can be used.

The guidance indicator 2500 can also include one or more alignment notifications 2504. The alignment notifications 2504 can be any suitable communicator that can provide a notification to the user that the guidance indicator 2500 is aligned with the array of photo sensors 2502. In this example, the alignment notifications 2504 are arrow-shaped shapes that can illuminate when the reference from the guidance system is aligned with the array of photo sensors 2502. For example, the alignment notifications 2504 can illuminate and/or change color when the photo sensors 2502 located adjacent to the alignment notifications 2504 are aligned with the reference display from the guidance system. In other examples, the alignment notifications can be other shapes, or provide other or additional signals to the user of alignment such as audible notifications, flashing notifications, tactile notifications (vibrations) or the like.

During use, the guidance indicator 2500 can operate in a few different states. In a misaligned state (as shown in FIG. 25B), the reference cross hair of the guidance system that can include a first marker 2510 and a second marker 2512 is not aligned with the array of photo sensors 2502. The alignment notifications 2504 can remain unilluminated when such misalignment is present. In some examples, the alignment notifications 2504 can indicate to the use a direction or and indication of the misalignment. In the example shown, the crosshair is misaligned in a first quadrant of the array of photo sensors 2502. In this instance, the top and right-side alignment notifications 2504 can illuminate to indicate the misalignment of the crosshair and the array of photosensors. Similarly, if the crosshair were misaligned in the third quadrant of the array of photo sensors 2502 (i.e. bottom-left quadrant), the bottom and the left-side alignment notifications 2504 can illuminate to indicate the location of the misalignment. In other examples, other notifications can be provided to indicate the misalignment and/or the direction that the user needs to move the ablation probe to achieve alignment.

As shown in FIG. 25C, the guidance indicator 2500 can also operate in an aligned state. In the aligned state, the crosshair can be aligned with the array of photo sensors 2502. When such alignment is achieved, one or more of the alignment notifications 2504 can illuminate or otherwise emit a signal to notify the user of alignment. In the example shown, when alignment is achieved, all four alignment notifications 2504 can illuminate.

As can be appreciated, the guidance indicator 2500 can include other sensors, other alignment notifications and other user interfaces such as LCD screens or the like to communicate with the user to notify the user of alignment and of misalignment as well as providing feedback to the user regarding alignment of the probe to the reference display and/or the predetermined probe location and/or the probe orientation.

Various methods are also contemplated by the present disclosure. In some embodiments, methods of positioning an ablation probe using a guidance system and/or a guidance indicator are contemplated. In one method, a guidance system can be used to display one or more references on a subject. The references can be laser references that project a crosshair or other symbol on the subject.

A guidance indicator can be coupled to an ablation probe. Any suitable guidance indicator can be used. Any of the example guidance indicators can be used in this step of the method. The guidance indicator can be integrally formed with the ablation probe (i.e., not removable) or in the handle portion of the ablation probe. In other examples, the guidance indicator can be removable and this step contemplates attaching the guidance indicator to the ablation probe. The guidance indicator can be attached to a proximal end of the ablation probe and can be aligned with a needle of the ablation probe as previously described.

The method can continue by aligning a distal end of the ablation probe to a first reference from the guidance system. The first reference can indicate an entrance point for the ablation probe into the subject. The user can move the ablation probe and position the distal end of the probe at or aligned with the first reference.

The method can then include aligning a proximal end of the ablation probe with a second reference from the guidance system. The second reference can generally indicate an orientation of the probe relative the first reference. The guidance indicator can be used to align the proximal end of the probe with the second reference. The guidance indicators of the present disclosure can make this step easier than existing probes because the guidance indicators can include markings, sensors or other alignment features with the second reference.

When the ablation probe is in an aligned position, the user (i.e. the medical professional) can perform the treatment procedure on the subject in a manner that will allow the ablation probe to be guided and/or positioned in a desired manner with respect to the target tissue. In this manner, the likelihood that the ablation probe will be positioned in a desirable position relative to the target tissue and with minimal or reduced damage to surrounding health tissue and body structures is improved over existing probes and methods.

The example methods and apparatuses described herein may be at least partially embodied in the form of computer-implemented processes and apparatus for practicing those processes and/or the described functionality. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An ablation probe comprising:
   an elongated needle portion comprising a distal end to be positioned at a target tissue and a proximal end positioned away from the distal end;
   a handle portion connected to the needle portion at the proximal end; and
   a removable guidance indicator positioned on the handle and aligned with the needle portion, the guidance indicator having a disc shape and defining a channel, the channel sized to accept the handle therein.

2. The ablation probe of claim 1, wherein the guidance indicator comprises a recessed planar surface oriented substantially perpendicular to an axis of the needle portion.

3. The ablation probe of claim 1, wherein the guidance indicator comprises a first marking and a second marking, the second marking oriented perpendicular to the first marking, the first marking and the second marking configured to align to one or more lasers of a laser guidance system.

4. The ablation probe of claim 1, wherein the guidance indicator is positioned on a curved outer surface of the handle.

5. The ablation probe of claim 1, wherein the probe is a cryoablation probe.

6. The ablation probe of claim 1, wherein the probe is a radio frequency (RF) ablation probe.

7. The ablation probe of claim 1, wherein the probe is a microwave ablation probe.

8. The ablation probe of claim 1, wherein the guidance indicator comprises at least one optical sensor and is configured to determine a predetermined alignment of the probe.

9. The ablation probe of claim 1, wherein the guidance indicator comprises an array of optical sensors and at least one alignment notification, the at least one alignment notification configured to indicate alignment of the probe to a reference of a guidance system.

10. A guidance indicator for use with an ablation probe comprising:
    an attachment portion configured to removably attach to a handle of the ablation probe, the attachment portion defining a channel for receiving a handle of the ablation probe therein; and
    a target portion comprising at least one marking;
    wherein the attachment portion and the at least one marking are positioned such the at least one marking is positioned a predetermined location relative to a needle of the ablation probe when the attachment portion is attached to the ablation probe.

11. The guidance indicator of claim 10, wherein the predetermined location corresponds to an alignment of the at least one marking with a central axis of the needle of the ablation probe.

12. The guidance indicator of claim 11, wherein the attachment portion fits around the handle of the ablation probe via an interference fit.

13. A method of positioning an ablation probe comprising:
    connecting the guidance indicator of claim 1 to an ablation probe;
    aligning a distal end of the probe relative to a subject using a first reference from a guidance system;
    aligning a proximal end of the probe relative to the subject using a second reference from the guidance system and the guidance indicator on the probe; and
    removing the guidance indicator from the ablation probe prior to treatment.

14. The method of claim 13, further comprising aligning at least one marking on the guidance indicator with the second reference from the guidance system.

15. The method of claim 13, wherein the step of aligning the proximal end of the probe comprises determining a predetermined alignment using at least one optical sensor in the guidance indicator.

* * * * *